United States Patent
Humphries

(12) 
(10) Patent No.: US 8,472,447 B2
(45) Date of Patent: Jun. 25, 2013

(54) IP MULTICAST SNOOPING AND ROUTING WITH MULTI-CHASSIS LINK AGGREGATION

(75) Inventor: Kevin J. Humphries, West Jordan, UT (US)

(73) Assignee: Alcatel Lucent, Paris (FR)

( * ) Notice: Subject to any disclaimer, the term of this patent is extended or adjusted under 35 U.S.C. 154(b) by 200 days.

(21) Appl. No.: 13/010,382

(22) Filed: Jan. 20, 2011

(65) Prior Publication Data
US 2012/0033668 A1 Feb. 9, 2012

Related U.S. Application Data

(60) Provisional application No. 61/370,622, filed on Aug. 4, 2010.

(51) Int. Cl.
*H04L 12/28* (2006.01)
(52) U.S. Cl.
USPC .................. 370/392; 370/395.53; 370/401
(58) Field of Classification Search
CPC ......... H04L 45/28; H04L 45/22; H04L 45/245; H04L 45/58; H04L 49/45
USPC ............ 370/217, 225, 228, 389, 392, 395.53, 370/401
See application file for complete search history.

(56) References Cited

U.S. PATENT DOCUMENTS

| | | | |
|---|---|---|---|
| 7,161,948 B2 | 1/2007 | Sampath et al. | |
| 7,173,934 B2 | 2/2007 | Lapuh et al. | |
| 2005/0041665 A1* | 2/2005 | Weyman et al. | 370/390 |
| 2006/0039375 A1 | 2/2006 | Bahls | |
| 2006/0146823 A1 | 7/2006 | Ding | |
| 2010/0020680 A1* | 1/2010 | Salam et al. | 370/225 |

OTHER PUBLICATIONS

International Search Report and Written Opinion for PCT/US2010/021516 dated May 8, 2012, 13 pages.

* cited by examiner

*Primary Examiner* — Jung Park
(74) *Attorney, Agent, or Firm* — Garlick & Markison; Holly L. Rudnick

(57) ABSTRACT

Aggregation Switches connected via a virtual fabric link (VFL) are each active and able to perform at least limited IP multicast snooping. The resulting IP multicast snooping information is maintained internally within each Aggregation Switch and shared substantially in real-time therebetween via the VFL.

19 Claims, 15 Drawing Sheets

IP MULTICAST SNOOPING AND ROUTING WITH MULTI-CHASSIS LINK AGGREGATION

CROSS-REFERENCE TO RELATED PATENTS

The present U.S. Utility Patent Application claims priority pursuant to 35 U.S.C. §119(e) to U.S. Provisional Application Ser. No. 61/370,622, entitled, "MULTI-CHASSIS VIRTUAL-FABRIC LINK AGGREGATION SYSTEM," filed Aug. 4, 2010, which is incorporated by reference herein and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to data networks and in particular to systems and methods for providing IP multicast snooping and routing.

2. Description of Related Art

Data networks allow many different computing devices, for example, personal computers, IP telephony devices or servers to communicate with each other and/or with various other network elements or remote servers attached to the network. For example, data networks may comprise, without limitation, Metro Ethernet or Enterprise Ethernet networks that support multiple applications including, for example, voice-over-IP (VoIP), data and video applications. Such networks regularly include many interconnected nodes, commonly known as switches or routers, for routing traffic through the network.

The various nodes are often distinguished based on their location within particular areas of the network, commonly characterizing two or three "tiers" or "layers," depending on the size of the network. Conventionally, a three tier network consists of an edge layer, an aggregation layer and a core layer (whereas a two tier network consists of only an edge layer and core layer). The edge layer of data networks includes edge (also called access) networks that typically provide connectivity from an Enterprise network or home network, such as a local area network, to a metro or core network. The edge/access layer is the entry point of the network, i.e., to which the customer network is nominally attached, and the switches residing at the edge layer are known as edge nodes. Different types of edge networks include digital subscriber line, hybrid fiber coax (HFC) and fiber to the home. Edge nodes may perform, for example, L2 switching functions for the attached devices. The edge nodes are generally connected to an aggregate layer that terminates access links coming from multiple edge nodes. Switches residing at the aggregation layer are known as Aggregation Switches. Aggregation Switches may perform, for example, L2 switching and L3 routing of traffic received via the aggregate links from the edge nodes. The aggregate layer is connected to a metro or core network layer that performs Layer 3/IP routing of traffic received from the Aggregation Switches (in a three tier network) or from edge nodes (in a two tier network). As will be appreciated, nodes at each incremental layer of the network typically have larger capacity and faster throughput.

One of the key challenges faced by data networks is the need for network resiliency, i.e., the ability to maintain high availability despite eventual component failures, link failures or the like, which is critical to providing satisfactory network performance. Network resiliency may be achieved in part through topological redundancy, i.e., by providing redundant nodes (and redundant components within nodes) and multiple physical paths between nodes to prevent single points of failure, and in part through L2/L3 protocols to exploit the redundancy upon occurrences of failures to converge upon alternate paths for switching/routing traffic flows through the network. As will be appreciated, detection and convergence times must occur quickly (advantageously, less than one second) to achieve seamless transition to the alternate paths.

Ethernet protocol is a transport technology that is used ubiquitously in local area networks (LAN), such as the home and enterprise networks to communicate between computers and networks. However, the use of Ethernet protocol technology in access and aggregate networks, as well as metro networks, is continuing to rise and to revolutionize the edge network as it did the enterprise network. As an access technology, Ethernet offers significant advantages over other access technologies, such as: (i) future-proof transport for data, video and voice applications; (ii) cost-effective infrastructure for data services; and (iii) simple, globally accepted standard that will ensure interoperability.

In order to adapt Ethernet technology to a carrier-grade service environment in edge and aggregate layer networks, a number of issues remain to be addressed, including resiliency to failures. In one known solution, the spanning tree protocol (STP) is commonly used to detect failures and divert traffic to alternate paths when failures occur in Ethernet networks. Generally, STP relies on multiple physical paths between switches, but with only one path active at any one time, the other path being placed in a blocking mode (defining an "active/passive" paradigm). When failures occur, an alternative path is brought out of the blocking mode into an active state, thereby re-establishing the connection.

However, STP can result in unacceptable convergence times (e.g., up to several seconds) in some network topologies, including without limitation, convergence between edge nodes and Aggregation switches of a data network. Further, STP provides only for an active/passive operation paradigm whereby not all links are actively forwarding traffic at the same time.

In an active-active environment, as described in co-pending U.S. patent application Ser. No. 13/010,168, filed on even date herewith, in which all paths are simultaneously active on redundant Aggregation switches, the convergence time can be greatly reduced. However, in order to allow multiple Aggregation switches to cooperate in such a multi-chassis system, the Aggregation switches may need to exchange control information to ensure proper routing and switching between the Aggregation switches and the edge nodes.

In particular, with respect to Internet Protocol (IP) multicast snooping, information learned on one of the Aggregation switches may need to be shared with the other Aggregation switch for efficient switching and for redundancy purposes. IP snooping refers to the process of listening to Internet Group Management Protocol (IGMP) network traffic between computing devices and routers to derive a map of which devices need which IP multicast streams. IP snooping is designed to prevent devices on a virtual local area network (VLAN) from receiving traffic for a multicast group they have not explicitly joined. For example, IP snooping typically provides switches with a mechanism to prune multicast traffic from links that do not contain a multicast listener (an IGMP client). Essentially, IP snooping is a Layer 2 optimization for Layer 3 IGMP.

Since IP snooping takes place internally on switches, in a multi-chassis system, in which both Aggregation switches are active, each switch needs to have knowledge of which links to forward multicast traffic on. In addition, the Layer 3 routing process should be optimized between the switches to avoid redundant querying for requested multicast traffic.

Accordingly, there is a need for systems and methods for providing IP multicast snooping within a multi-chassis system.

DETAILED DESCRIPTION OF THE INVENTION

Figure 1:
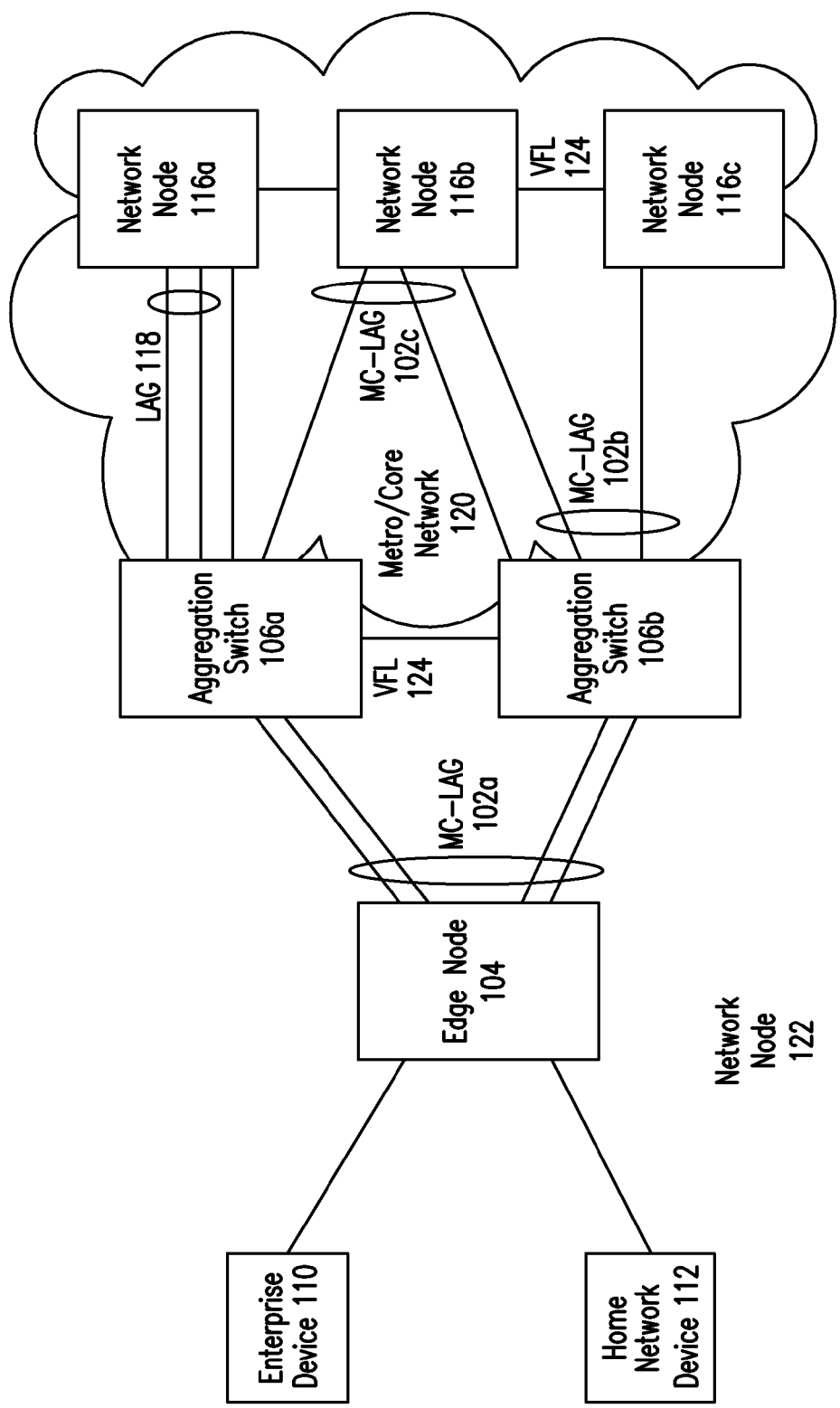
FIG. 1 illustrates a schematic block diagram of an embodiment of a network architecture in accordance with the present invention.

FIG. 1 illustrates an embodiment of a resilient network 100 with multi-chassis link aggregation that provides an active/active paradigm (i.e., all links actively forwarding traffic at the same time) that more fully utilizes the capacity of the network nodes. The following abbreviations are herewith defined:

| | |
|---|---|
| CMM | Chassis Management Module |
| IGMP | Internet Group Management Protocol |
| IP | Internet Protocol |
| IPMS | Internet Protocol Multicast Snooping |
| LAG | Link Aggregation |
| L2 | Layer 2 ("Data Link Layer") of the OSI model for networks |
| L3 | Layer 3 ("Network Layer") of the OSI model for networks |
| MAC | Media Access Control Protocol |
| MC-LAG | Multi-Chassis Link Aggregate Group |
| MC-VFA | Multi-Chassis Virtual Fabric Aggregation |
| MLD | Multicast Listener Discovery protocol |
| NIM | Network Interface Module |
| STP | Spanning Tree Protocol |
| VLAN | Virtual Local Area Network |
| VRRP | Virtual Router Redundancy Protocol |
| ASIC | Application Specific Integrated Circuit |

The following standards are referred to in this application and are incorporated by reference herein: 1) the Link Aggregation Control Protocol (LACP) which was formerly clause 43 of the IEEE 802.3 standard added in March 2000 by the IEEE 802.3ad task force and is currently as incorporated in IEEE 802.1AX-2008 on Nov. 3, 2008; and 2) IEEE Std. 802.1Q, Virtual Bridged Local Area Networks, 2003 edition.

The LACP provides a method to control the bundling of several physical links, called a link aggregation group (LAG), between two peer nodes to form a single logical channel there between. The peer nodes negotiate the bundling of the physical links into a LAG by exchanging LACP packets, or alternatively the LAG can be configured manually. Link aggregation offers an inexpensive way to transfer more data than any one single port or link can deliver alone. In an embodiment, the ports of a LAG include the same physical type, such as all copper ports (CAT-5E/CAT-6), all multi-mode fiber ports (SX), or all single-mode fiber ports (LX). In another embodiment, the ports of a LAG may have a different physical type.

To provide increased resiliency and remove a single point of failure, a LAG is split across two devices as seen in FIG. 1 and is referred to herein as a multi-chassis link aggregation group (MC-LAG) 102. For example, in FIG. 1, MC-LAG 102a originates from edge node 104 and is split into two subsets and connected to two Aggregation Switches 106a and 106b, with one or more physical links of the MC-LAG 102a in each subset. In an embodiment, the edge node 104 may use load balancing techniques to distribute traffic across all available links of the MC-LAG 102a. For each packet transmitted over the MC-LAG 102a, one of the physical links is selected based on a load-balancing algorithm (usually involving a hash function operating on the source and destination Internet Protocol (IP) or Media Access Control (MAC) address information). Load balancing across the physical links of the MC-LAG 102 results in a more effective use of bandwidth.

As seen in FIG. 1, the edge node 104 is connected over an access network 122 to an enterprise network device 110, such as a bridge, switch, router, etc., that is operating in a LAN, and/or it may also be connected to a home network device 112, such as a DSL modem, set-top box, optical line terminal, etc. The edge node 104 is a switch or server and may functionally include a digital subscriber line access multiplexer (DSLAM), cable modem termination system (CMTS), optical line terminal (OLT), etc. in an embodiment but may include other types of devices as well.

In an embodiment, the Aggregation Switches 106 are coupled with a virtual fabric link (VFL) 124. The VFL 124 provides a connection for exchange of information between the Aggregation Switches regarding traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP) and the status of the MC-LAG 102a. The Aggregation Switches 106 operate transparently to the edge node 104 and are treated as a single logical device by the edge node 104. The edge node 104 is able to actively forward traffic on the MC-LAG 102a while the synchronization of MAC address tables and other forwarding information between the Aggregation Switches 106 is driven by L2 packet flows over the VFL along with a reduced amount of control messaging in an embodiment. This feature enables dual homing of the edge node 104 to the pair of Aggregation Switches 106 and provides a Layer 2 multi-path intra-structure as well as basic Layer 3 access infra-structure. In addition, in an embodiment, the MC-VFA feature provides this functionality without requiring Layer 2 redundancy protocols (e.g. Spanning Tree) between the edge node 104 and Aggregation Switches 106, while still facilitating a carrier-grade detection and convergence time to edge uplink failures as well as aggregation/core switch failures. Many recent network designs, especially for data centers, are requiring an ever increasing number of layer 2 adjacencies between edge node and Aggregation Switches. This trend is pushing the limits of the spanning tree protocol, such as loop-detection function and convergence times. The spanning tree convergence time can be of up to several seconds in many current network topologies. The multi-chassis architecture in an embodiment provides a dual-homed, layer 2 multi-path connection between the edge node 104 and Aggregation Switches 106 preferably without needing to run the spanning tree protocol operation for loop prevention, while still being flexible enough to allow the spanning tree protocol operation along with the multi-chassis functionality in some of the portions of the network topology in an embodiment (e.g. between the Aggregation Switches over the virtual fabric link as well as over the links connecting these devices to upstream/core switches).

The feature in some embodiments also facilitates fast fail-over detection and convergence times for access uplink failures, virtual fabric link failures and node failures. Another advantage of the MC-VFA architecture in an embodiment is the active/active forwarding mode of the edge node 104 whereby both sets of operational MC-LAG uplinks are processing traffic to increase efficiency of the use of bandwidth of the MC-LAG links.

As seen in FIG. 1, in an embodiment, the Aggregation Switches 106 are also connected to a metro or core network 120 that includes one or more network nodes 116, such as network switches and/or routers, using the MC-LAG functionality (as part of the MC-VFA architecture) as described herein. For example, aggregate switch 106b is connected to network nodes 116b and 116c over MC-LAG 102b wherein the network nodes 116b and 116c exchange state information over a VFL as well. The MC-LAG 102b architecture provides a dual-homed, layer 2 multi-path connection between the aggregation switch 106b and network nodes 116b and 116c. In an embodiment, network nodes 116 can also be connected using MC-LAG functionality, as seen with MC-LAG 102c and VFL 124. The Aggregation Switches 106 may also be connected to the network nodes 116 using a standard LAG, such as LAG 118, or other trunks or links.

Figure 2:
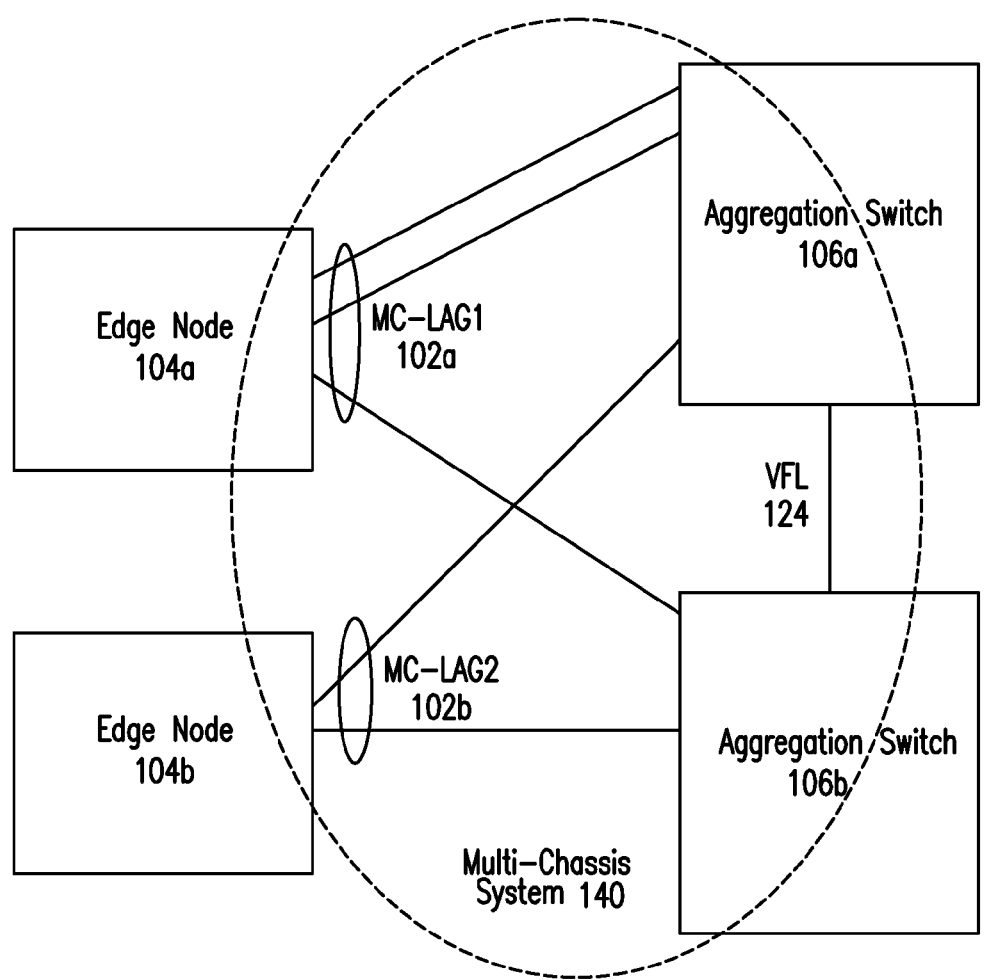
FIG. 2 illustrates a schematic block diagram of an embodiment of a multi-chassis system in accordance with the present invention.

The MC-VFA architecture is now described in more detail with respect to FIG. 2. Edge node 104a is connected to Aggregation Switches 106a and 106b by a first MC-LAG1 102a while edge node 104b is connected to Aggregation Switches 104a and 104b by second MC-LAG2 102b. Each MC-LAG 102a and 102b includes a plurality of physical links divided into at least two subsets, wherein each of the two subsets includes at least one physical link. As seen in FIG. 2, the first set of MC-LAG 102a physical links are terminated at a first Aggregation Switch 106a while the second set of MC-LAG 102a physical links are terminated at a second Aggregation Switch 106b. MC-LAG1 forms logical dual homed, layer 2 multi-paths. The MC-LAG member ports are the external, user ports that are members of the MC-LAG 102. The VFL 124 is an aggregate of ports that in an embodiment span multiple network interface modules for resiliency and provides for inter-chassis traffic and control/state data transfer. The multi-chassis system 140 includes the Aggregation Switches 106, the virtual fabric link 124, the MC-LAG 102a, the MC-LAG 102b and their respective MC-LAG member ports attached to the downstream edge devices. The Aggregation Switches 106a and 106b are separate physical switches with each operable as a stand-alone switch and each encased by its own separate physical chassis. The Aggregation Switches 106a and 106b may be in the same geographic area, such as in a central office or data center, or may be separate geographic locations, such as different buildings or cities, to provide geo diversity.

The edge nodes 104 operating as MC-LAG clients attached to the Aggregation Switches can use different methods to assign traffic to the links within their aggregates as long as the choice of links remains fixed for a given flow. This ensures that traffic is delivered in-sequence between any pair of communicating end stations. In an embodiment, the same number of uplink ports from the edge devices to each one of the MC-LAG Aggregation Switches should preferably be configured. In other words, if two uplinks are configured between the edge switch and one of the MC-LAG Aggregation Switches, then two uplinks between the edge switch and the other multi-chassis switch should also be configured. Although not mandatory, this arrangement provides a more homogeneous traffic distribution for flows between the multi-chassis switches and the edge device.

Figure 3:
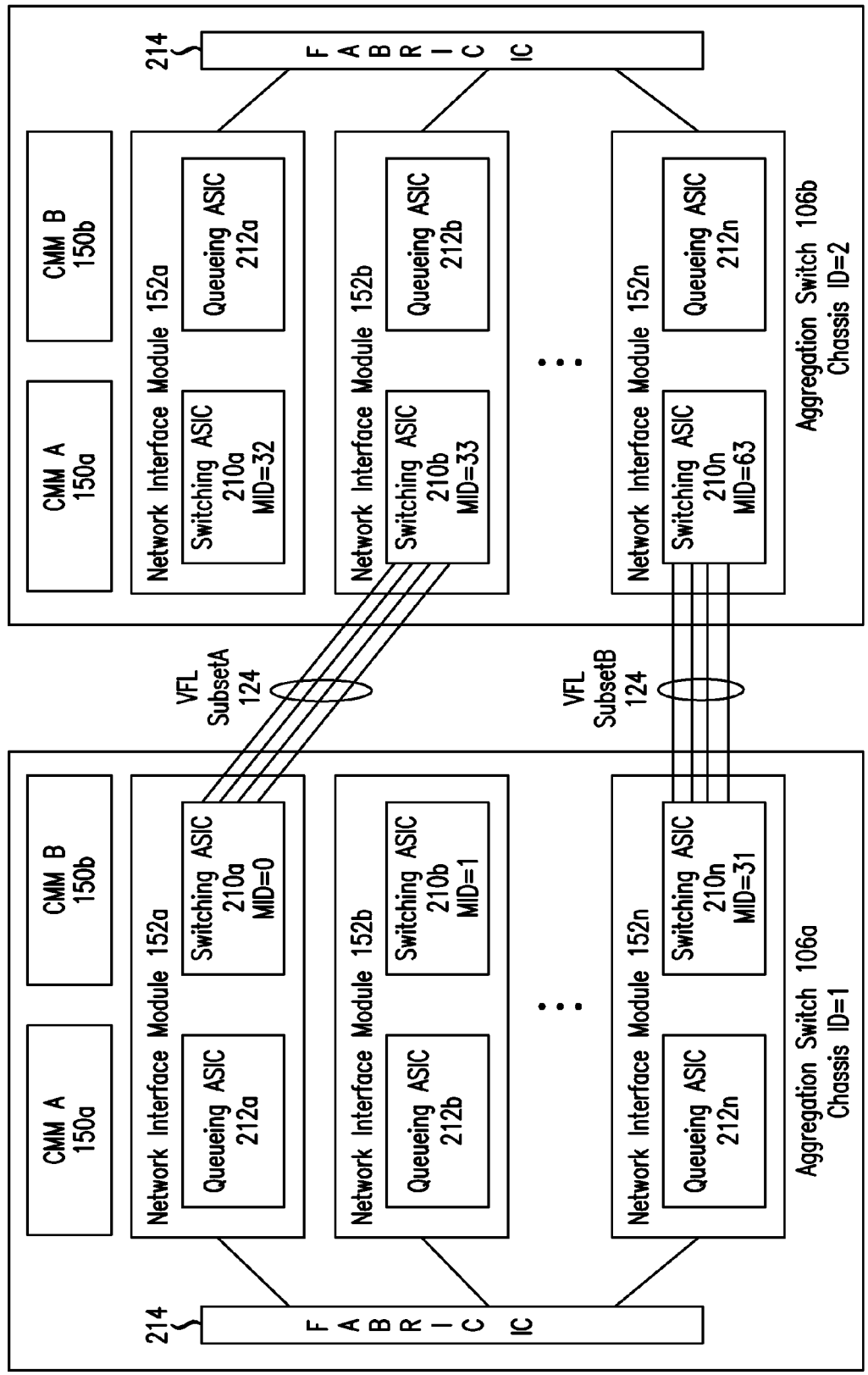
FIG. 3 illustrates a schematic block diagram of an embodiments of Aggregation Switches in a multi-chassis system in accordance with the present invention.

The Virtual fabric link (VFL) 124 between the Aggregation Switches 106 is now described in more detail with respect to FIG. 3. The Aggregation Switches 106 in one embodiment each include at least one CMM module 150a (primary) and preferably a second CMM module 150b (back-up) as well as a plurality of Network Interface modules (NIM) 152, such as line cards or port modules. The VFL 124 is an aggregate of VFL member ports connected to one or more NIMs 152, in the first and second Aggregation Switches 106. For example, VFL 124 includes a first subset A of physical links between NIM 152a of Aggregation Switch 106a and NIM 152b of Aggregation Switch 106b, and a second subset B of physical links between NIMs 152n of Aggregation Switch 106a and 106b. In an embodiment, the VFL links are connected between Switching ASICs 210 residing in the NIMs 152 of the Aggregation Switches 106. The NIMs 152 each also include a Queuing ASIC 212, described further below. A switching fabric integrated circuit (IC) 214 provides an interconnection between the various NIMs 152 in the Aggregation Switch 106.

A unique chassis identifier is assigned to each Aggregation Switch 106 in the multi-chassis system. The Chassis ID for each Aggregation Switch 106 is unique and global, e.g. each Aggregation Switch is aware of the chassis ID of its peer Aggregation Switch. Unique hardware device identifiers (MIDs) for various components, such as IC, NIM, CMM, in each Aggregation Switch are also generated allowing for management of local and remote objects. In an embodiment, the hardware device identifiers for the Switching ASICs 210 have global significance within the multi-chassis system while MIDs for other components, such as Queuing ASICs 212, may have only local significance. For example, the hardware device identifiers' assigned to the Switching ASICs 210 are known by both Aggregation Switches 106 while hardware device identifiers for other devices are restricted to a local Aggregation Switch and have no significance to the remote Aggregation Switch.

In an embodiment, the Switching ASICs 210 are assigned a global unique hardware device identifier (MID) in a range assigned to its Aggregation Switch, such as:

Aggregation Switch 106a: Chassis ID=1 and MID values 0-31

Aggregation Switch 106b: Chassis ID=2 and MID values 32-63

Exemplary MIDs assigned to Switching ASICs 210 are shown in FIG. 3. By knowing the assigned range, a module is able to determine the location of a switching ASIC from its MID as in Aggregation Switch 106a or Aggregation Switch 106b. In an embodiment, the Switching ASICs 210 operate in a pre-pended header mode to exchange data and control packets between the Aggregation Switches 106.

Figure 4:
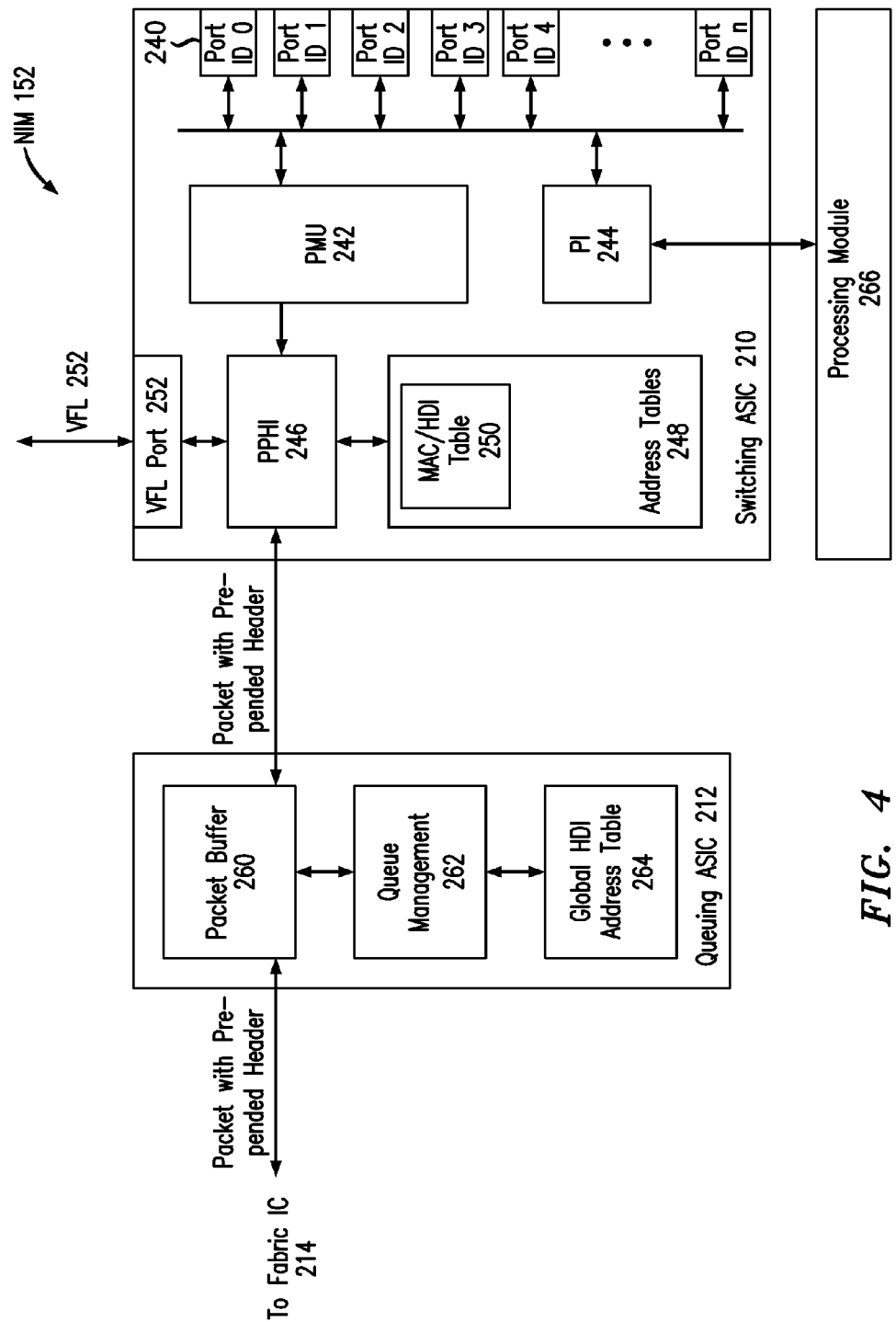
FIG. 4 illustrates a schematic block diagram of an embodiment of a network interface module of an Aggregation Switch in a multi-chassis system in accordance with the present invention.

FIG. 4 illustrates a schematic block diagram of an embodiment of a network interface module (NIM) 152 in more detail. The Switching ASIC 210 includes a plurality of external port interfaces 240 that are connected to external nodes, such as edge nodes 104a and 104b. One or more of the external port interfaces 240 may include member ports for a MC-LAG physical link, LAG or other trunk group, fixed link, etc. The external ports 240 may have the same physical interface type, such as copper ports (CAT-5E/CAT-6), multi-mode fiber ports (SX) or single-mode fiber ports (LX). In another embodiment, the external ports 240 may have one or more different physical interface types.

The external ports 240 are assigned external port interface identifiers (Port ID), e.g., device port values, such as gport and dport values, associated with the Switching ASICs 210. In an embodiment, MIDs of the Switching ASICs 210 and external port interface identifiers for external ports 240 on the Switching ASICs 210 are used to uniquely identify a physical external port interface 240 of a Switching ASIC 210 on either the local or remote Aggregation Switch in the multi-chassis system. In another embodiment, a Port Manger that includes a conversion module or other entity may convert the MIDs of the Switching ASICs 210 and external port identifiers into a single integer value, to generate a global port value (GPV), e.g. MID 4; device port identifier (dport) 5 converts to GPV 20. In either example, unique external port identifiers for the external ports of NIMs 152 in both the local and remote Aggregation Switches are generated. Unique port identifiers may also be assigned to internal ports of a Switching ASIC 210, such as an internal port from the Switching ASIC 210 to a processing module on the NIM 152. These internal ports are also uniquely identified by the port identifier and the MID of the Switching ASIC.

The Switching ASIC 210 further includes a packet management unit (PMU) 242 that determines a destination address of incoming packets. The packets may be switched to another external port interface 240 of the Switching ASIC 210, to the Queuing ASIC 212 for transmission to another NIM 152 on the local or remote aggregate switch, or to the processor interface (PI) 244 for transmission to a processing module 266 of the NIM 152 external or internal to the Switching ASIC 210.

When a packet is to be transmitted to another NIM 152 on the local or remote Aggregation Switch, in an embodiment, the Switching ASIC 210 transfers the packet to a pre-pended packet header interface (PPHI) that adds or otherwise modifies the packet header to include hardware device information (HDI). The HDI includes identifiers of hardware devices associated with the source and/or the destination of the packet. In an embodiment, the pre-pended header may include other information such as packet priority and load balance identifiers. To obtain destination HDI information, the PPHI performs a look-up process to MAC/HDI forwarding table 250. The MAC/HDI forwarding table 250 stored in the address table memory 248 includes a list of MAC address entries, such as MAC address for external devices, nodes, modules, software or hardware connected to the Aggregation Switch 106. The MAC address entries include associated hardware device information used in bridging or routing a packet to reach a device with the associated MAC address. The destination hardware device information includes, for example, the port identifier and MID of a Switching ASIC 210 (e.g. MID=24, port ID=5 or MID=54, device port=12), of either the local or peer Aggregation Switch, associated with the destination MAC address. In another embodiment, the destination hardware device information may include the global port value (GPV) of the external port interface associated with the destination MAC address. The MAC/HDI forwarding table 250 may include one or more tables, such as source trunk map, trunk bitmap table, trunk group tables, VLAN mapping table, etc. In an embodiment, the MAC/HDI forwarding table 250 or parts thereof may be located in the Queuing ASIC of the NIM 152 as well.

In an embodiment, when the Switching ASIC 210 includes an active VFL member port 252 with a link to the remote Aggregation Switch, the MAC/HDI forwarding table 250 may include additional HDI information, such as a table to associate gport values into Switching ASIC MID values and device port values and/or a table with logical aggregate group identifiers mapping to external port interfaces.

In an embodiment, the pre-pended header includes hardware device information HDI associated with the source port, such as an external or internal port interface, including hardware device identifier MID of the Switching ASIC and device port identifier of the source port.

In another embodiment, the pre-pended header includes HDI associated with a Switching ASIC 210 connected to the VFL port 124 (such as MID=0 or MID=31 for Aggregation Switch 106a in FIG. 3). The Switching ASIC 210 connected to the VFL port will then translate or convert the HDI in the pre-pended header before transmitting the packet over the VFL.

In an embodiment, the PPHI 246 also appends source hardware device information associated with the source port, e.g. the external port interface 240 that first received the packet. The source hardware device information may include the MID of the Switching ASIC 210 and the port identifier (e.g., device port) and/or global port value (GPV) of the external port interface 240. Additional information, such as destination hardware device identifier or MID, a destination device port, VLAN ID, packet type (multicast, unicast, broadcast), packet priority and load balance identifier is also added to the pre-pended header in an embodiment. In an embodiment, the destination HDI is retrieved from the address tables 248, such as MAC/HDI forwarding table 250.

The packet with the pre-pended header is then transmitted to the Queuing ASIC 212 for routing over the Fabric IC 214. The Queuing ASIC 212 includes a packet buffer 260, a queue management 262 for providing traffic and buffer management and a global HDI address table 264. The global HDI address table 264 maps the destination HDI to the appropriate queues in Queuing ASICs 212 in one or more of the other NIMs 152. For example, the mapping provides information for switching the packet into an appropriate egress queue for one or more of the external port interfaces in other Queuing/Switching ASICs in the Aggregation Switch 106 based on the hardware device information in the pre-pended header. In another example, when the destination HDI indicates a destination on the remote Aggregation Switch (i.e. the destination device identifier belongs to a remote/peer switch range), the Queuing ASIC 212 switches the packet to an appropriate egress queue for one or more of the VFL port interfaces in the local Aggregation Switch 106 for transmission to the remote Aggregation Switch over the VFL 124, e.g. the global HDI address table 264 indicates that the associated hardware device is located on the remote Aggregation Switch. In this scenario, the determination of the egress queue corresponding to a particular VFL port interface is made based on the load balance identifier present in the pre-pended header and inserted previously by the switching ASIC 210.

Though the switching ASIC 210 and Queuing ASIC 212 are illustrated as separate integrated circuits or modules, one or more functions or components of the ASICs may be included on the other ASIC or combined into an alternate ASIC or otherwise be implemented in one or more integrated circuits.

Figure 5:
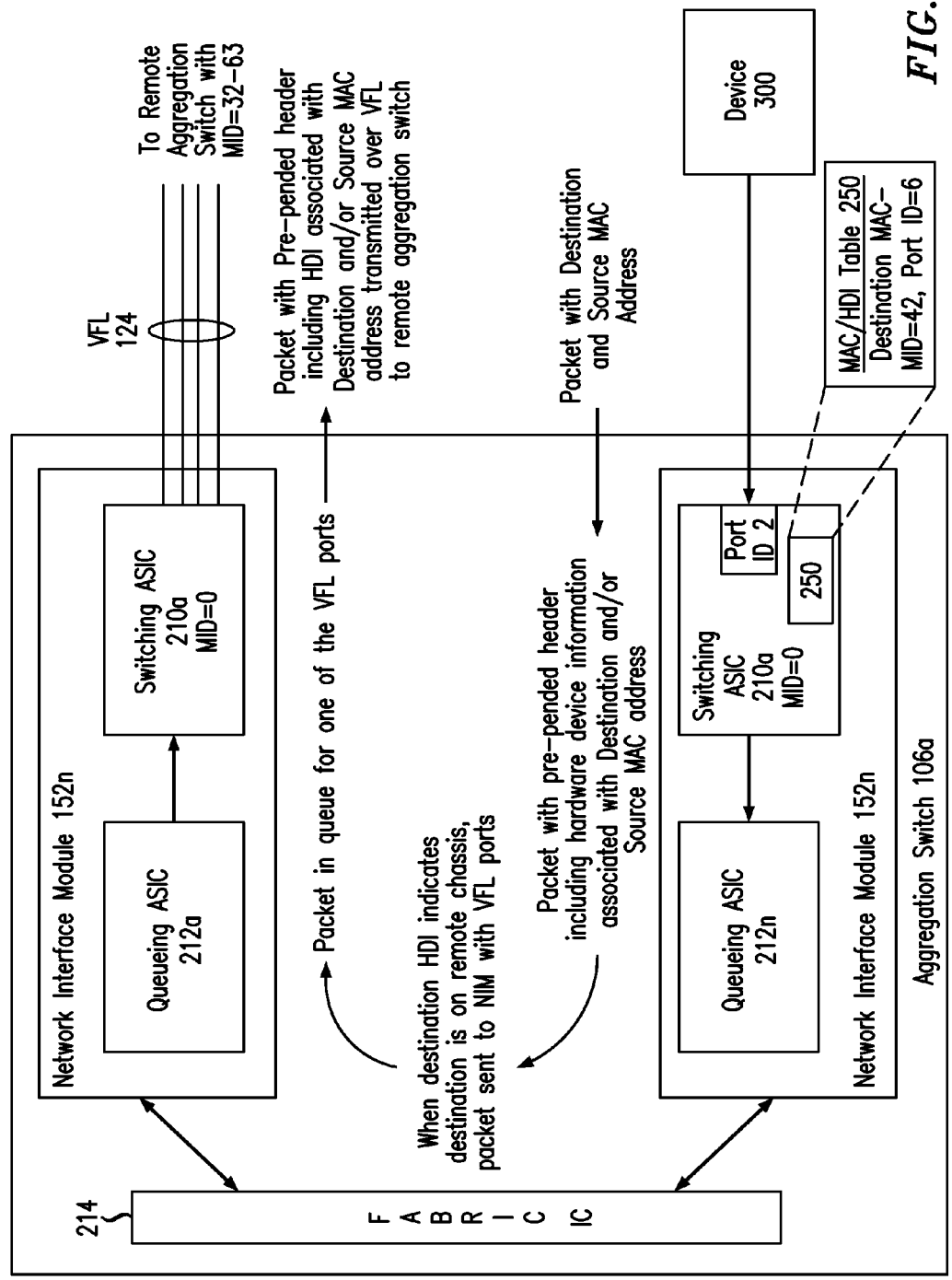
FIG. 5 illustrates a schematic block diagram of an embodiment of packet flow through an Aggregation Switch in a multi-chassis system in accordance with the present invention.

FIG. 5 illustrates a schematic block diagram of an embodiment of a packet flow through Aggregation Switch 106a to VFL 124. In this example, a device 300 with source MAC address, such as enterprise device 110 or home network device 112, transmits a packet, e.g. through edge node 104, to Aggregation Switch 106a with a destination MAC address of a device that may be accessed over an external port interface of the remote Aggregation Switch 106b. Switching ASIC 210n, e.g. with MID=31 in FIG. 5, in NIM 152n receives the packet on an external port interface 240, e.g. with port ID=2. The Switching ASIC 210n extracts a destination MAC address and performs an address table look-up to determine hardware device information (HDI) associated with the destination MAC address from MAC/HDI forwarding table 250. The destination HDI may include, e.g., device module identifiers (MIDs) of one or more hardware components in a path to the destination device with the MAC address, such as NIMs 152, Queuing ASICs 212, Switching ASICS 210, external port identifiers 240, member ports of the VFL 124, of either the local Aggregation Switch 106a or remote Aggregation Switch 106b. In an embodiment, the destination HDI may include the MID of the Switching ASIC 210 and port identifier (e.g., device port) of the external port interface 240 that provides access to the destination device. Furthermore, in an embodiment, the pre-pended header includes a packet priority and a load balance identifier determined based on parameters retrieved from the original packet (source MAC address, destination MAC address, source IP address, destination IP address). In another example, the HDI would include a global port value (GPV) for the external port interface 240 or MID of the NIM 152 that provides access to the destination device. In another embodiment, when the destination MAC address is associated with the remote Aggregation Switch, the HDI may include the hardware device identifier MID for the NIM 152a or Switching ASIC 210 (such as MID=0) connected to the VFL 124. The destination HDI is added to a pre-pended header that adds information to the original packet header (such as a layer 2, Ethernet packet header type). The Switching ASIC 210n also includes source hardware device information (HDI) for one or more devices associated with the originating external port interface, e.g. port ID=2. The source HDI may include one or more hardware device identifiers, such as MID of the originating Switching ASIC 210, source port identifier (e.g. device port), global port value, MID for source NIM 152, Chassis ID, etc.

The packet with pre-pended header is transmitted to the Queuing ASIC 212n which then determines a NIM 152 on the local Aggregation Switch to transmit the packet based on the destination HDI. When the destination HDI indicates a local external port interface on the Aggregation Switch 106a (e.g. based on the destination MID contained in the pre-pended header), the Queuing ASIC 212n places the packet in an egress queue for transmission to the corresponding NIM 152 of the local external port interface. In another example illustrated in FIG. 5, the Queuing ASIC 212n determines that the destination HDI indicates a destination hardware device on the remote Aggregation Switch, e.g. the HDI indicates Switching ASIC with MID=45 on the remote Aggregation Switch. To reach the remote Aggregation Switch, the packet needs to be transmitted over the VFL 124. So, the Queuing ASIC 212n transmits the packet with pre-pended header from a queue over the Fabric IC 214 to NIM 152a connected to the VFL 124. The selection of a VFL member port is made based on the load balance identifier parameters carried on the pre-pended header. The Queuing ASIC 212a on NIM 152a receives the packet with pre-pended header and queues the packet for transmission over the VFL 124. The Switching ASIC 210a then transmits the packet with pre-pended header including the source and/or destination HDI to the remote Aggregation Switch over the VFL 124.

In an embodiment, the Switching ASIC 210a may alter the pre-pended header prior to transmission over the VFL 124. For example, the Switching ASIC 210a may translate a destination HDI with local significance (e.g., a gport value or local hardware device identifier MID) to an HDI with global significance. The Switching ASIC 210a then transmits the packet with pre-pended header including the source and/or destination HDI to the remote Aggregation Switch over the VFL 124.

In an embodiment, when multiple Switching ASICs 210 of an Aggregation Switch 106 are connected to the VFL 124, e.g. in FIG. 3, Switching ASICs MID=0 and MID=31, the traffic to be transmitted over the VFL 124 may be distributed. For example, a load balance identifier map table in the Global HDI Address Table 264 of the Queueing ASIC 212 would indicate the following distribution:

| Destination MID | Outgoing Port | MID's Device Location |
| --- | --- | --- |
| [0-31] | VFL 124 | Local |
| [32-63] | VFL 124 | Remote |

The Queueing ASICs 212 map the packets to the appropriate VFL port interface using the load balance identifiers or other load balancing techniques. For example, in an embodiment with 8 NIMs 152 on each Aggregation Switch, each Queuing ASIC 212n has a set of 8 queues configured to each NIM (Module ID, Port) within the local Aggregation Switch. In an embodiment, the Queuing ASICs 212 connected to the Switching ASICs 210 with the VFL 124 have a separate set of 8 queues related to each VFL member port interface. Each of those queues is assigned to the FIFOs associated with the internal VFL ports connecting the multi-chassis switches. In an embodiment, with multiple Virtual Fabric Link member ports, the queues are assigned such that the destination ports on the remote chassis are equally distributed among the Queuing ASICs 212a and 212n that host the Virtual Fabric Link Member Ports.

In an embodiment, the MAC/HDI forwarding tables in the NIMs 152 are populated and then updated in response to layer 2 packets flowing through the system. Since the pre-pended header includes source MAC address and source HDI information, the NIMS 152, e.g. in specific the Switching ASICs 210 in an embodiment, are able to populate the MAC/HDI forwarding table 250 with this information. By operating in a pre-pended header mode to exchange Layer 2 packets with source MAC addresses and source HDI over the VFL 124, the Switching ASICs 210 are able to synchronize MAC address tables between the Aggregation Switches 106. Though the MAC/HDI forwarding table is described in the Switching ASICs 210, the MAC/HDI forwarding table may be included, alternatively or in addition to, in the Queuing ASICs 212n or other module of the NIM 152. In another embodiment, the CMM 150 (primary and secondary) may also include a MAC/HDI forwarding table for one or more types of links between the Aggregation Switches 106.

Figure 6:
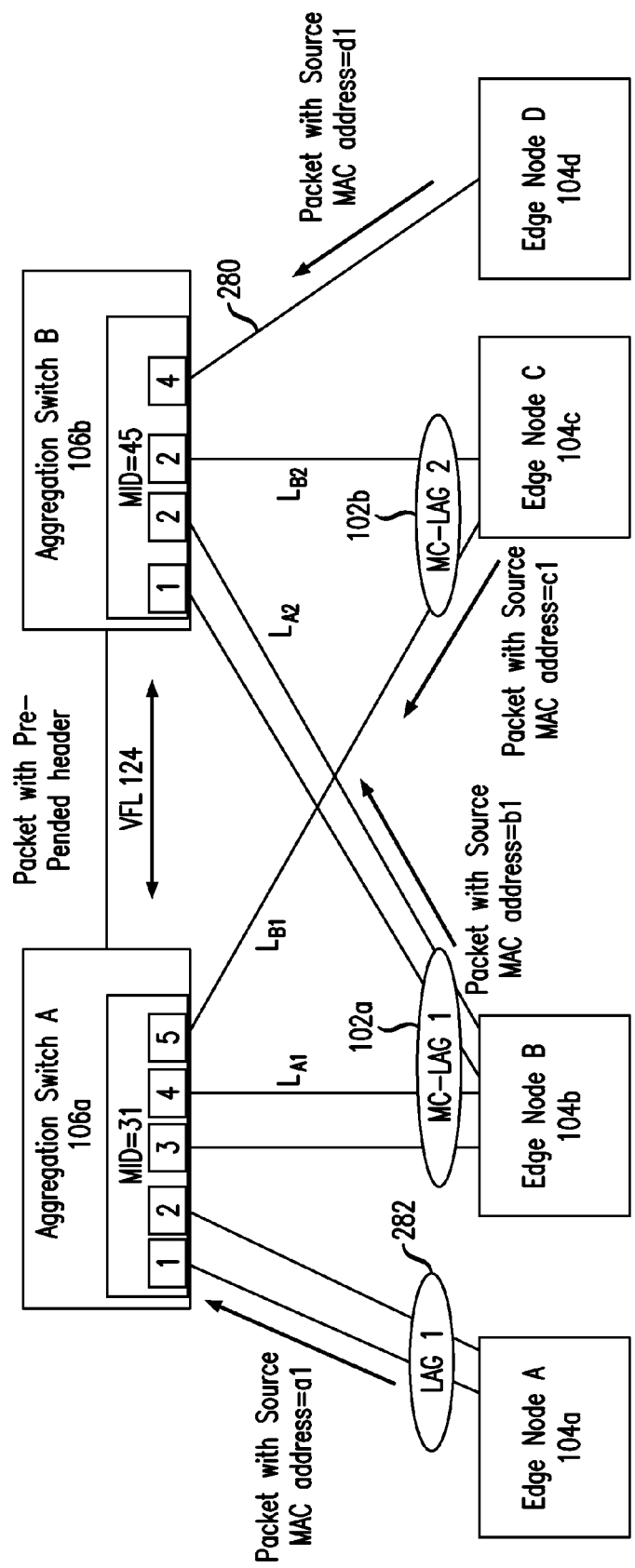
FIG. 6 illustrates a schematic block diagram of an embodiment of source address learning in a multi-chassis system in accordance with the present invention.

FIG. 6 illustrates a schematic block diagram of an embodiment of a multi-chassis system that illustrates source MAC learning. Edge nodes 104 are connected to Aggregation Switches 106a and 106b over logical aggregate group LAG1 282, multi-chassis logical aggregate group MC-LAG1 102a, multi-chassis logical aggregate group MC-LAG2 102b and fixed port link 280. In an embodiment, each Aggregation Switch communicates to the other Aggregation Switch configuration information for logical aggregate groups, such as LAG1 and other types of trunk groups, and hardware device information associated thereto. In an embodiment, the hardware device information includes physical ports associated with the logical aggregate groups, e.g. hardware device or module identifiers (MID) of Switching ASICS and external port identifiers for links associated with the logical aggregate groups (device port values or gport values).

For example, in an embodiment, Aggregation Switch A notifies Aggregation Switch B that the logical aggregate group with aggregate group identifier LAG1 is associated with a Switching ASIC having a hardware device module identifier MID=31 and external port interface with identifier device port=1, 2. Aggregation Switch B notifies Aggregation Switch A that the logical aggregate group with aggregate group identifier MC-LAG1 is associated with a Switching ASIC having hardware device module identifier MID=45 and external port interface identifier device port=1, 2. Other hardware device information, such as identifiers of NIMs, Queuing ASICs, etc. associated with the logical aggregate groups may be exchanged alternatively or in addition to the Switching ASIC's MIDs and device port values. The Aggregation Switches 106 also provide notifications of updates to the configuration information of the logical aggregate groups for both ordinary aggregates and multi-chassis aggregate groups. The hardware device information associated with the logical aggregate groups and multi-chassis aggregates of either of the Aggregation Switches is included in one or more of the MAC/HDI forwarding tables in NIMs 152 on both Aggregation Switches. For example, in an embodiment, one or more of the MAC/HDI forwarding tables in both Aggregation Switches 106 includes the following information:

| Type of Aggregate Group | Aggregate Group Identifier | HDI List of VFL Member Ports |
|---|---|---|
| LAG | LAG1 | (MID = 31, Port ID = 1) |
|  |  | (MID = 31, Port ID = 2) |
| MC-LAG | MC-LAG1 | (MID = 31, Port ID = 3) |
|  |  | (MID = 31, Port ID = 4) |
|  |  | (MID = 45, Port ID = 1) |
|  |  | (MID = 45, Port ID = 2) |
| MC-LAG | MC-LAG2 | (MID = 31, Port ID = 5) |
|  |  | (MID = 45, Port ID = 3) |

Since the same aggregate group identifiers for logical aggregate groups (e.g. LAG1) are known and utilized by both Aggregation Switches 106, in an embodiment, the multi-chassis system assigns a subset of aggregate group identifiers to each type of logical group and for each of the Aggregation Switches 106. For example, in an embodiment with a maximum of 128 possible aggregate groups, an assignment of aggregate group identifiers would include:

| Type of Aggregate Group | Aggregation Switch | Range Configuration | Range Default | Example |
|---|---|---|---|---|
| LAG | chassis 1 | MIN_LAG_ID_LOCAL MAX_LAG_ID_LOCAL | [0-47] | [0-100] |
| LAG | chassis 2 | MIN_LAG_ID_REMOTE MAX_LAG_ID_REMOTE | [48-95] | [101-120] |
| MC-LAG | Both chassis | MIN_MC-LAG_ID MAX_MC-LAG_ID | [96-127] | [121-127] |

The Aggregation Switches 106 assign aggregate group identifiers based on the assigned ranges and type of aggregate group. As such, packet forwarding in the Aggregation Switches is performed by accessing the MAC/HDI forwarding tables and using the mapping between the logical aggregate groups and hardware device information. Typically, aggregate identifier information is not transferred in the pre-pended headers.

In an embodiment, to facilitate load balancing over a LAG or MC-LAG, when an Aggregation Switch 106 receives a packet over the VFL 124 with destination HDI information, such as (MID, Port ID), the Aggregation Switch 106 determines whether the destination HDI is included in a logical aggregate group by searching for the port identified in the source HDI (destination MID, destination Port identifier) in one or more of its internal trunk tables that contain a list of all ports that are active members of each LAG or MC-LAG aggregate group. When a destination port is found in an associated LAG or MC-LAG, the Aggregation Switch 106 may perform load balancing techniques by assigning the packet to one or more different external port interfaces of the associated LAG. For example, when Switching ASIC 210 connected to the VFL in the remote Aggregation Switch 106b receives a packet with destination HDI of MID=45, port 2, the switching ASIC 210 determines from its MAC/HDI table below, that MID=45, port 2 is part of MC-LAG1 as shown in the example in FIG. 6. The switching ASIC may then decide to perform load balancing and determine through one or more hash algorithms to transmit the packet over MID=45, port 1 of MC-LAG1 instead. In this particular example, the switching ASIC will then strip off the pre-pended header prior to transmitting the packet out of the external port (MID=45, port 1).

| Aggregation Switch A | |
|---|---|
| LAG ID | HDI |
| LAG1 | (MID = 31, Port ID = 1) |
|  | (MID = 31, Port ID = 2) |
| MC-LAG1 | (MID = 31, Port ID = 3) |
|  | (MID = 31, Port ID = 4) |
|  | (MID = 45, Port ID = 1) |
|  | (MID = 45, Port ID = 2) |
| MC-LAG-2 | (MID = 31, Port ID = 5) |
|  | (MID = 45, Port ID = 3) |

Referring back to FIG. 6, various embodiments of methods and implementations therefore are now described for learning source MAC addresses and associated hardware device information (HDI) in a multi-chassis system. First, in an embodiment, for unknown unicast packets ingressing on a configured fixed port of one of the Aggregation Switches (e.g. traffic originating on fixed port 280 with source MAC address=d1), the Source MAC address is populated in MAC/HDI forwarding tables on both Aggregation Switches 106a and 106b as associated with hardware device information (HDI) of the originating configured fixed port (such as MID of Switching ASIC and source port identifier value or gport value of the source port, NIM identifier, or other hardware device ID associated with the source port). As such, in an embodiment, the source MAC address d1 is stored in one or more MAC/HDI forwarding tables of both Aggregation Switch A and Aggregation Switch B with the VLAN ID and HDI associated with the source port, e.g., MID=45, Port ID=4.

Next, in an embodiment, unknown unicast traffic ingressing on a logical aggregate group connected to only one of the Aggregation Switches 106, such as a trunk group or other type of LAG (e.g. traffic originating on LAG1 with source MAC address=a1), the Source MAC address is populated in MAC/HDI forwarding tables on both Aggregation Switches 106a and 106b as associated with the originating logical aggregate group identifier (e.g., LAG1). As such, in an embodiment, the source MAC address a1 received on LAG1 by Aggregation Switch A is stored in one or more MAC/HDI forwarding tables of both the Aggregation Switches 106 with the VLAN ID and logical aggregate group identifier LAG1. In addition, as explained herein, the MAC/HDI forwarding tables of both Aggregation Switches store the hardware device information associated with logical aggregate groups (learned through distribution of configuration information by the CMM 150 module or other control plane process). The MAC/HDI forwarding tables thus include information that MAC address a1 is associated with trunk group identifier LAG1 and HDI information associated with LAG1.

Further, in an embodiment, for unknown unicast traffic ingressing on a MC-LAG member port (e.g. traffic originating on MC-LAG1 or MC-LAG2) of either Aggregation Switch 106, the Source MAC is populated in MAC/HDI forwarding tables as associated with the MC-LAG identifier and HDI information of the local member ports of the MC-LAG. The HDI information of the member ports of the MC-LAG will be the same for the MAC/LAG tables on each Aggregation Switch 106. In other words, both Aggregation Switches are fully aware of the entire list of member ports that are active participants of an MC-LAG aggregate group regardless of whether a member port is local or remote.

By associating member ports of a MC-LAG with a source MAC address, traffic destined to the MAC address through one of the edge nodes 104 is forwarded preferably via the MC-LAG member ports through the shortest path. This path reduces the amount of traffic crossing the VFL 124. In addition, it reduces MAC movement problems in some specific scenarios wherein traffic to and from an edge node 104 takes different paths over the MC-LAG for distinct flows. In the example of FIG. 6 in an embodiment, one or more of the MAC/HDI forwarding tables on the Aggregation Switches 106 includes the following information.

| Aggregation Switch A | | |
|---|---|---|
| MAC | LAG | LAG ID |
| a1 | Yes | LAG1 |
| b1 | Yes | MC-LAG1 |
| c1 | Yes | MC-LAG-2 |
| d1 | No | — |

| Aggregation Switch B | | |
|---|---|---|
| MAC | LAG | LAG ID |
| a1 | Yes | LAG1 |
| b1 | Yes | MC-LAG1 |
| c1 | Yes | MC-LAG-2 |
| d1 | No | — |

In another embodiment, MAC address tables displayed in a node or network management application may not include the HDI for the logical aggregation groups. The user displayed MAC address table may only include HDI for fixed ports and thus are similar for both Aggregation Switches 106.

| Aggregation Switch A | | | |
|---|---|---|---|
| MAC | LAG | LAG ID | HDI |
| a1 | Yes | LAG1 | N/A |
| b1 | Yes | MC-LAG1 | N/A |
| c1 | Yes | MC-LAG-2 | N/A |
| d1 | No | — | (MID = 45, Port ID = 4) |

| Aggregation Switch B | | | |
|---|---|---|---|
| MAC | LAG | LAG ID | HDI |
| a1 | Yes | LAG1 | N/A |
| b1 | Yes | MC-LAG1 | N/A |
| c1 | Yes | MC-LAG-2 | N/A |
| d1 | No | — | (MID = 45, Port ID = 4) |

The MAC/HDI forwarding tables are synchronized with respect to the LAG identifiers associated with the source MAC addresses. In addition, VLAN IDs associated with the MAC addresses may also be configured and synchronized on both Aggregation Switches. As such, logically, the Aggregation Switches 106 operate as a single bridge for MAC learning. Furthermore, MAC learning occurs automatically as traffic flows over the VFL 124 with minimum Layer 2/control module management software intervention and without the need for inter-process communication message-based MAC table synchronization.

Figure 7:
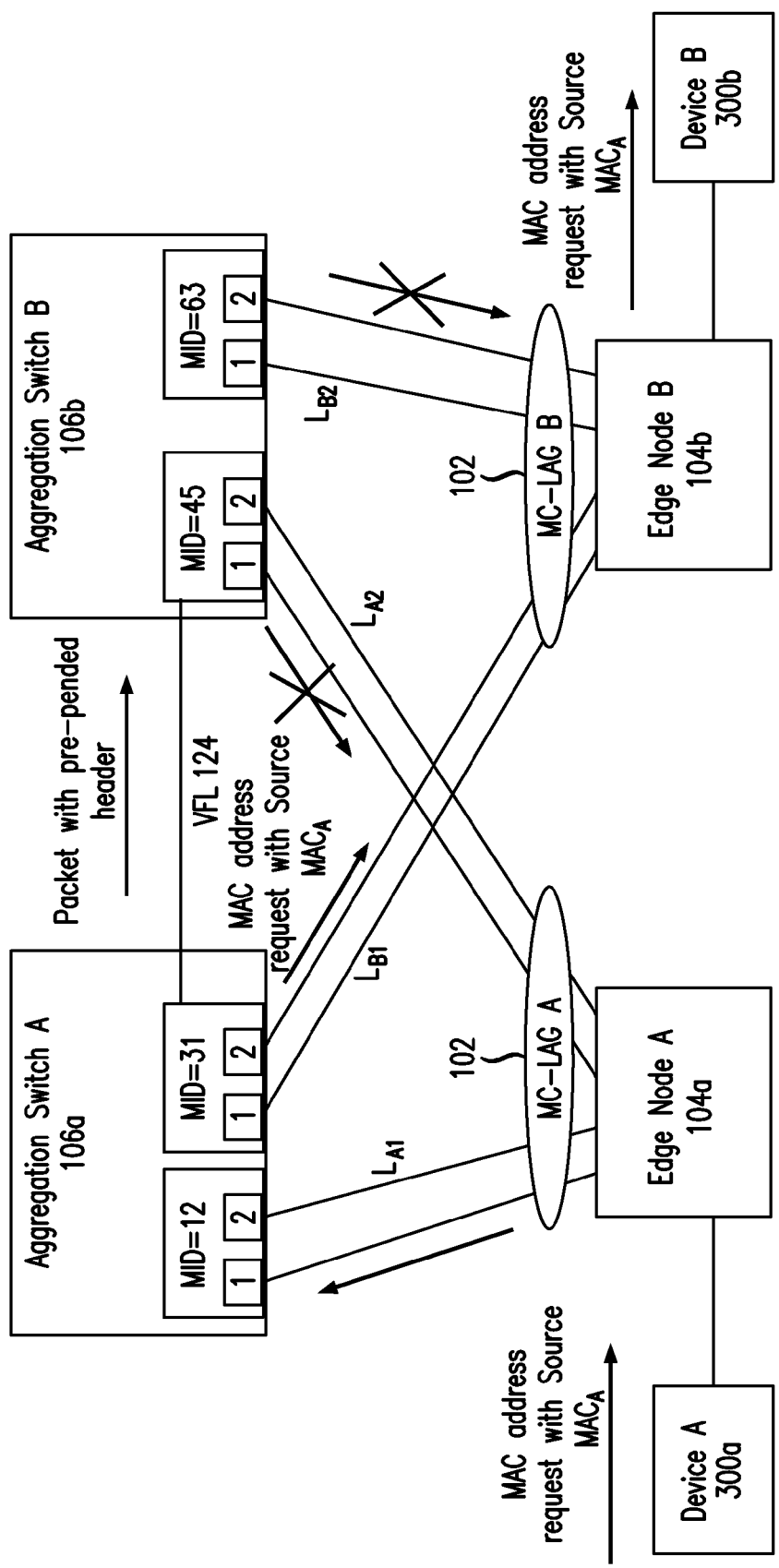
FIG. 7 illustrates a schematic block diagram of another embodiment of source address learning in a multi-chassis system in accordance with the present invention.

FIG. 7 illustrates an embodiment of a method for source MAC learning in a multi-chassis system in more detail. To determine a MAC address for device B, device A 300a (with MAC address=$MAC_A$) transmits a MAC address request, e.g. an address resolution packet (ARP) used in Ethernet protocols, with the target IP address for device B 300b. For example, the MAC address request may include:

Source MAC=$MAC_A$
Destination MAC=ff:ff:ff:ff:ff:ff (unknown)
Target IP=$IP_B$
VLAN ID=ID
Packet Type=Broadcast.

When received by the edge node 104a, it forwards the MAC address request over MC-LAG A to the "logical" Aggregation Switch 106 (composed of two physical switches 106a and 106b). Depending on the load balancing or hashing algorithm, the edge node 104a may transmit the MAC address request over either of the subsets of physical links of MC-LAG A, either $L_{A1}$ or $L_{A2}$. For this example, assume that the MAC address request is transmitted over $L_{A1}$ connected to Aggregation Switch 106a. In general, in an Ethernet switch, a MAC address request (such as ARP) is copied and broadcast over every port associated with the VLAN ID. In an embodiment, when Aggregation Switch 106a receives the MAC address request, it first appends a pre-pended header to the MAC address request with source logical aggregate group identifier (e.g., MC-LAG A) and/or source HDI (e.g., MID=12, port ID=1). The Aggregation Switch (e.g., in specific switching ASIC MID=12) then broadcasts copies of the packet with pre-pended header to each Switching ASICs with external port interfaces associated with the VLAN ID, such as Switching ASIC MID=31 in this example. The Switching ASICs on the Aggregation Switch 106a (e.g. MID=12, MID=31) receiving the MAC address request with pre-pended header then learn the source MAC address and the associated aggregate group identifier (either explicitly present in the pre-pended header or by searching for the source HDI information in its trunk tables, which contain the complete list of MC-LAG A's member ports as described herein, e.g., MID=12, Port IDs=1, 2 and MID=45, Port IDs=1, 2) and are able to populate their MAC/HDI forwarding table with the aggregate group identifier information. For example, Switching ASIC MID=31 enters into its MAC/HDI forwarding table that source MAC address $MAC_A$ is associated with logical aggregate group MC-LAG A and/or with HDI of source port MID=12, port ID=1 depending on the specific embodiment. Prior to transmitting the MAC address request from external port interfaces to edge node B, Aggregation Switch 106a (e.g. Switching ASIC with MID=31) removes the pre-pended header thus retains an Ethernet or IP protocol header.

The Aggregation Switch 106a also transmits the broadcast packet with pre-pended header over the VFL 124 to Aggregation Switch 106b. The Aggregation Switch 106b also learns the source MAC address and associated aggregate group identifier and/or source HDI from the broadcast packet with pre-pended header. As described above, MAC addresses originating on MC-LAG local member ports in one Aggregation Switch and transmitted over the VFL are associated in the peer Aggregation Switch with the same MC-LAG because both switches are fully aware of the entire list of MC-LAG member ports. As such, when Aggregation Switch 106b receives the packet with pre-pended header, it stores the MC-LAG A's aggregate group identifier as associated with the source MAC address $MAC_A$. For example, Switching ASIC with MID=45 (and/or Switching ASIC with MID=63) enters into its MAC/HDI forwarding table that source MAC address $MAC_A$ is associated with logical aggregate group MC-LAG A.

Though a MAC address request is generally broadcast over every port associated with the VLAN ID, in an embodiment, a loop prevention mechanism prevents broadcast of packets received by an Aggregation Switch 106 over the Virtual Fabric Link 124 over local MC-LAG member ports. Thus, when Aggregation Switch 106b receives the MAC address request over VFL 124, it will not broadcast copies of the MAC address request over local MC-LAG A member ports $L_{A2}$ and local MC-LAG B member ports $L_{B2}$. This loop prevention mechanism prevents broadcast packet flows originating from Aggregation Switch A from looping to edge Node A and edge Node B through Aggregation Switch B. The loop prevention process thus provides for operation of the multi-chassis system without need of the spanning tree protocol on the MC-LAG member ports.

The Aggregation Switches 106a and 106b do not generate a response to the MAC address request because the destination IP address does not correspond to any of its local IP interfaces configured on its local VLANs. However, when edge node B receives the MAC address request (over $L_{B1}$), it will broadcast the packet to Device B which will then respond. As the response packet, which is a unicast packet, traverses the multi-chassis system to Device A, the source MAC address of Device B is learnt by the Aggregation Switches 106 in a similar process. Device A and Device B now are able to communicate with IP addressing over the Layer 2 multi-path infrastructure provided by the multi-chassis link aggregates. MAC addresses are learned as either associated with a particular port (for the case of fixed ports) or as associated with an aggregate group identifier (for the case of LAGs or MC-LAGs). Since the Aggregate Switches 106 have non-overlapping ranges of hardware device identifiers, MIDs, the hardware device identifiers are unique within the multi-chassis system 140. Using the global unique hardware device identifiers MIDs and external port identifiers, the MAC addresses can be associated with a fixed ports or aggregate group identifier.

Figure 8:
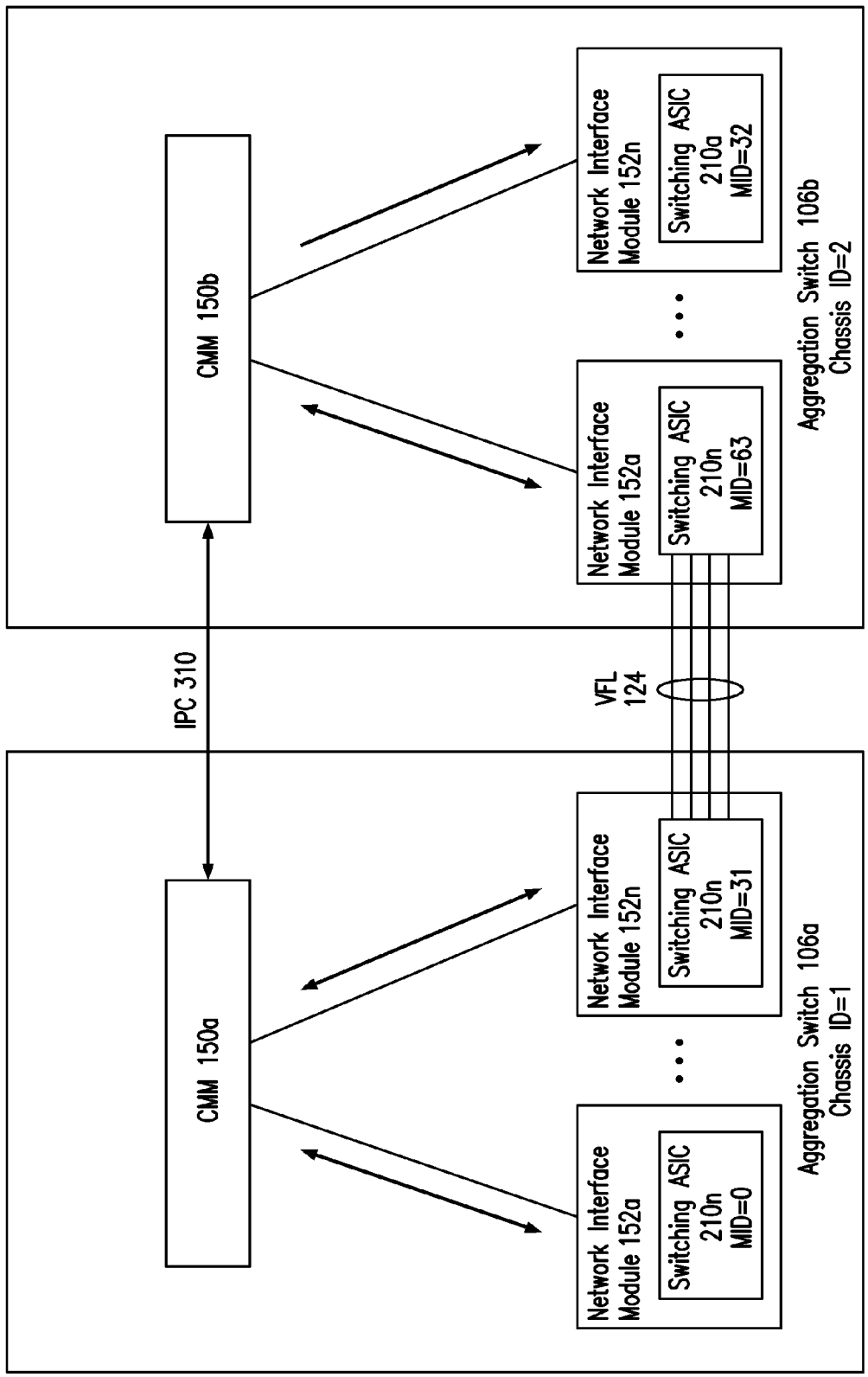
FIG. 8 illustrates a schematic block diagram of another embodiment of Aggregation Switches in a multi-chassis system in accordance with the present invention.

FIG. 8 illustrates a schematic block diagram of an embodiment for maintaining the MAC/HDI forwarding tables in the multi-chassis system. The MAC forwarding tables have a default or configured "aging" time for entries. When a MAC address in the MAC/HDI forwarding table has not been updated during the aging time, the entry will be deleted or flushed from the table. In the multi-chassis system however, the aging of entries may create a problem with continuous flooding when packet flows have different paths for the upstream and downstream directions. In order to maintain the MAC forwarding tables synchronized, a multi-chassis system needs to implement a keep-alive mechanism across the entire set of switches that are part of the system. Keep-alive packets are periodic packets (sent at a constant interval equal to the aging timeout parameter). These packets carry a reserved multicast destination MAC address to allow the packets to be flooded to all Switching ASIC devices 210 within all NIMs 152 in the multi-chassis system. The source MAC address of the packets is equal to the MAC address of each entry learned within the MAC forwarding table. As a result of this mechanism, a given MAC address will not age and be deleted or flushed unless it is no longer used in any of the Aggregate Switches within the multi-chassis system.

To avoid eternal MAC addresses (e.g., an address that will not age so as to be flushed or deleted), a MAC entry is assigned an "owner" or responsible module within the multi-chassis system. The owner of a MAC entry is generally a particular NIM 152. The MAC ownership is determined in different ways. For example, the MAC ownership may depend on the type of port on which it was first learned as follows. For MAC addresses associated with fixed ports, the Switching ASIC device 210 that contains the external port where the MAC address traffic was received is the owner of the MAC entry and controls the aging of the MAC address. Other Switching ASICs 210 learn this MAC address upon reception of a packet with a pre-pended header. The NIMs 152 that host such Switching ASIC devices 210 will not become owners of the MAC entry. A device becomes the owner of a MAC entry related to a fixed port only when it learned that address on from an external port interface.

For MAC addresses learned on aggregate ports (i.e. LAG or MC-LAG), the owner of a MAC address is determined by a similar mechanism as described for the fixed ports. The difference here is that the Switching ASICs 210 typically provide an additional feature called remote or local bit. This bit is only set when an entry is created and it never changes its value during the lifetime of a MAC entry. The local bit is set (i.e. local=1 or remote=0) only when: a) The entry does not already exist; b) A packet is received on a front panel port, e.g. there is no pre-pended header present. As a result of this approach, there will always be a single Switching ASIC device 210 in the system whose local bit is set. That NIM 152 hosting that Switching ASIC device 210 becomes the owner of this MAC address and hence responsible for the generation of keep-alive packets.

The NIMs 152 coordinate deleting an entry from the MAC/HDI forwarding tables. As shown in FIG. 8, a logical inter-process communication connection (IPC) 310 is created between the CMMs 150a and 150b of the Aggregation Switches 106. The same logical connections exist between any pair of NIMs 152. The IPC 310 may be created over the VFL 124 or over a LAN connection. When one of the NIMs 152 of a local Aggregation Switch 106a receives a flush message for a MAC address, it may decide to transmit the flush message to each of the other NIMs 152a-n on the local and remote Aggregation Switches 106a/b. The MAC/HDI tables in the Switching and/or Queuing ASICs in the NIMs 152a-n then flush the entry for the corresponding MAC address. The decision to whether delete the entry locally or not depends on the entry's ownership and type of port where the MAC entry was learned. Entries learned on fixed ports or ordinary aggregates (i.e. LAG) are flushed (and the corresponding event propagated) only if the flush request was received on the NIM 152 that owns the entry. Entries learned on MC-LAG aggregates are only flushed (and the flush event propagated) if there are no active/operational ports that are members of the aggregate neither in the local switch nor on the remote switch.

CMM 150a-b and NIMs 152a-n are aware of the entire list of MC-LAG member ports and their states (active/inactive) in the multi-chassis system. When the flush message includes a local port identifier (e.g., gport values) that is valid only on the local Aggregation Switch, the NIM 152 that owns that MAC address being deleted converts the local port identifier to a global port identifier (e.g. MID or modid and device port values) and then transmits the flush message over the IPC to the other NIMs 152a-n of the local and remote Aggregation Switches 106a/b. The flushing requests may be triggered by distinct events such a port interface status notifications (e.g. port down) or via explicit management request. For example, when CMM 150a receives a 'no mac-learning dynamic' management message or a static MAC address is deleted upon user request, and the flush allowance requirements describer earlier are met, then the CMM 150a transmits a flush message with the MAC address to NIMs 150a-n of Aggregation Switch 106a and to CMM 150b of the remote Aggregation Switch 106b.

Figure 9:
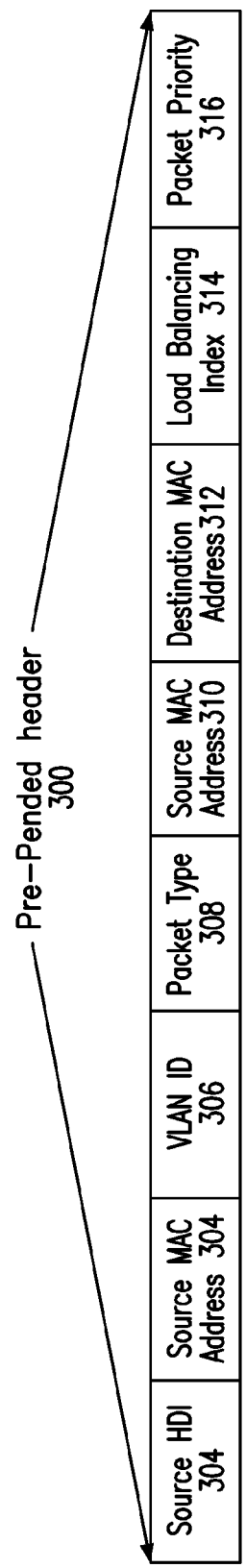
FIG. 9 illustrates a schematic block diagram of an embodiment of a pre-pended header of a packet in the multi-chassis domain.

FIG. 9 illustrates a schematic block diagram of an embodiment of a pre-pended header of a packet in the multi-chassis system. The pre-pended header 300 includes fields for source HDI 302, destination HDI 304, VLAN ID 306, packet type 308, source MAC address 310 and destination MAC address 312. In an embodiment, the pre-pended header may also include load balance identifier 314 and packet priority 316. The destination HDI 304 includes, for example, the port identifier and MID of a Switching ASIC (e.g. MID=24, port ID=5 or MID=54, device port=12), of either the local or peer Aggregation Switch, associated with the destination MAC address. In another embodiment, the destination hardware device information may include the global port value (GPV) of the external port interface associated the destination MAC address. The destination hardware device information may also include MID of the Switching ASIC connected to the VFL, NIMs, Queuing ASICs, etc. The source HDI 302 may include the MID of the Switching ASIC and the port identifier (e.g., device port) and/or global port value (GPV) of the external port interface. The load balance identifier 314 is used to help the Queueing ASIC to decide which VFL member port to be used as a transit/gateway port to reach the peer Aggregate Switch. The packet priority 316 is used by the Queueing ASIC to determine the specific priority queue.

Figure 10:
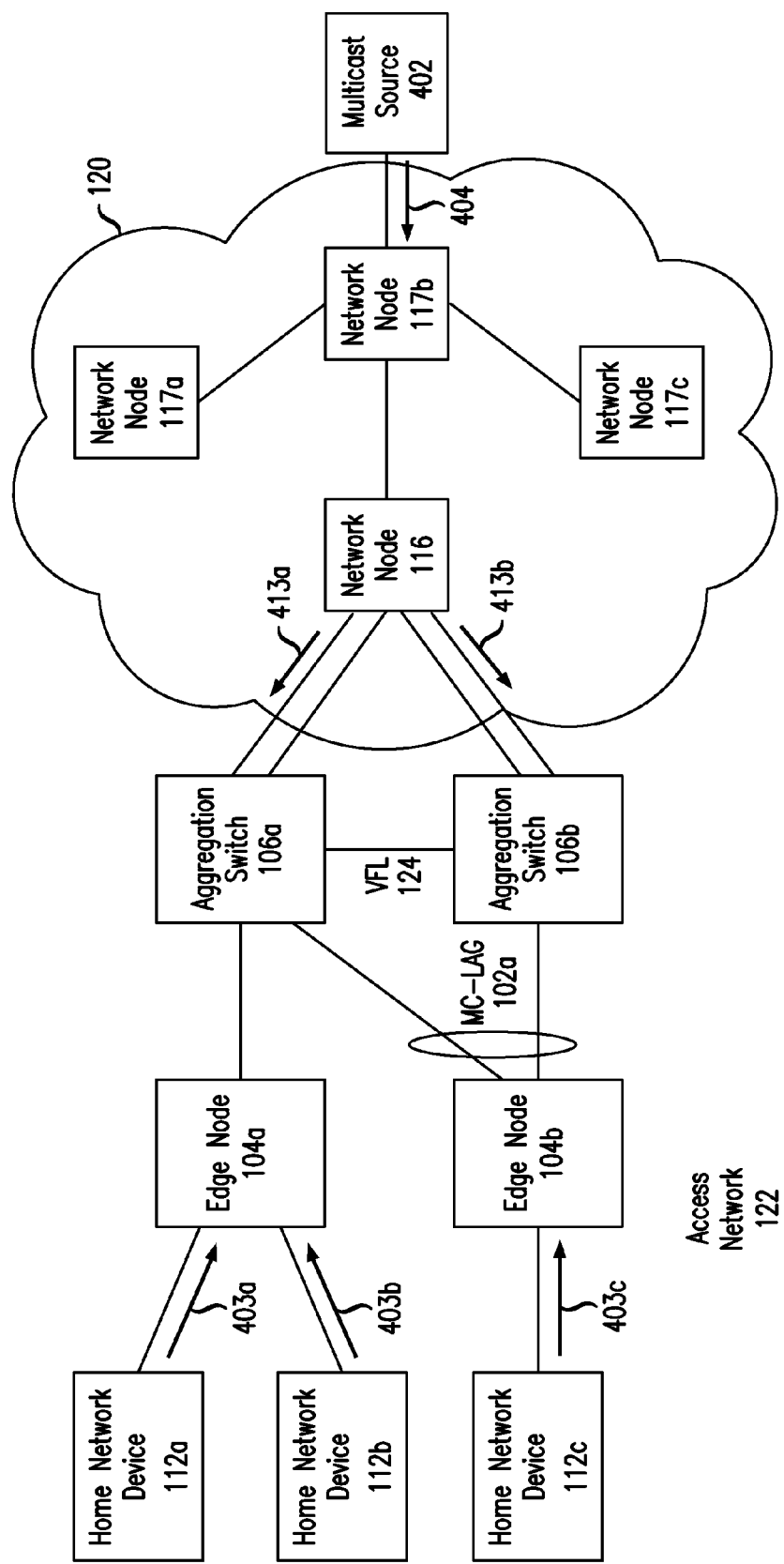
FIG. 10 illustrates a schematic block diagram of an embodiment for handling multicast traffic in accordance with the present invention.

FIG. 10 illustrates a schematic block diagram for handling multicast traffic. In a general multicast system, one or more home network devices 112a, 112b and 112c transmit respective membership reports 403a, 403b and 403c to receive multicast traffic 404 from any source or a particular multicast source 402. Membership reports 403a-403c are packets sent by devices 112a-112c either in response to queries 412a and 412b from upstream routers (e.g., Network Node 116) that contain the information for requesting a stream or when requesting a group/flow or leaving a group/flow. The multicast source 402, in turn, transmits the multicast traffic 404 to network nodes 117b, which in turn, may transmit the multicast traffic 404 to various network nodes 117a and 117c, and the multicast traffic 404 is routed through the core network 120 until reaching a network node 116 coupled to an access network 122 having end devices 112a, 112b and 112c that requested the multicast traffic. In the multi-chassis system of the present invention, as can be seen in FIG. 9, the network node 116 routes the multicast traffic toward the Aggregation Switches 106a and 106b, which then each forward the multicast traffic to the home network devices 112a, 112b and 112c that requested the multicast traffic 404 via respective edge nodes 104a and 104b.

In order to enable the Aggregation Switches 106a and 106b to properly forward the multicast traffic, each Aggregation Switch 106a and 106b is configured to perform IP multicast snooping. For example, each Aggregation Switch 106a and 106b can "listen" to Internet Group Management Protocol (IGMP) network traffic and Multicast Listener Discovery (MLD) traffic between edge nodes 104a and 104b and network nodes 116 to track various IP multicast snooping information, such as multicast queries (e.g., queries 412a and 412b), membership reports (e.g., membership reports 403a-403c), neighboring multicast routers (e.g., network node 116) and multicast flows (e.g., multicast traffic 404). However, with the introduction of the MC-LAG feature in the active-active paradigm of the Aggregation Switches 106a and 106b, where one or more edge nodes are connected to both Aggregation Switches in an active environment (e.g., Edge Node 104b is coupled to Aggregation Switches 106a and 106b via MC-LAG 102a), in accordance with embodiments of the present invention, various modifications may need to be made to traditional IP multicast snooping. In particular, each Aggregate Switch 106a and 106b can be configured to share their discovered IP multicast snooping information with the other Aggregate Switch 106a and 106b via the VFL 124, so that each switch has knowledge of which links to forward multicast traffic on and to prevent unnecessary routing of multicast traffic over the VFL 124. For example, multicast traffic 404 received at Aggregate Switch 106a from Network Node 116 can be sent over MC-LAG 102a towards Edge Node 104b without forwarding the multicast traffic 404 over the VFL 124 towards Aggregate Switch 106b.

Figure 11:
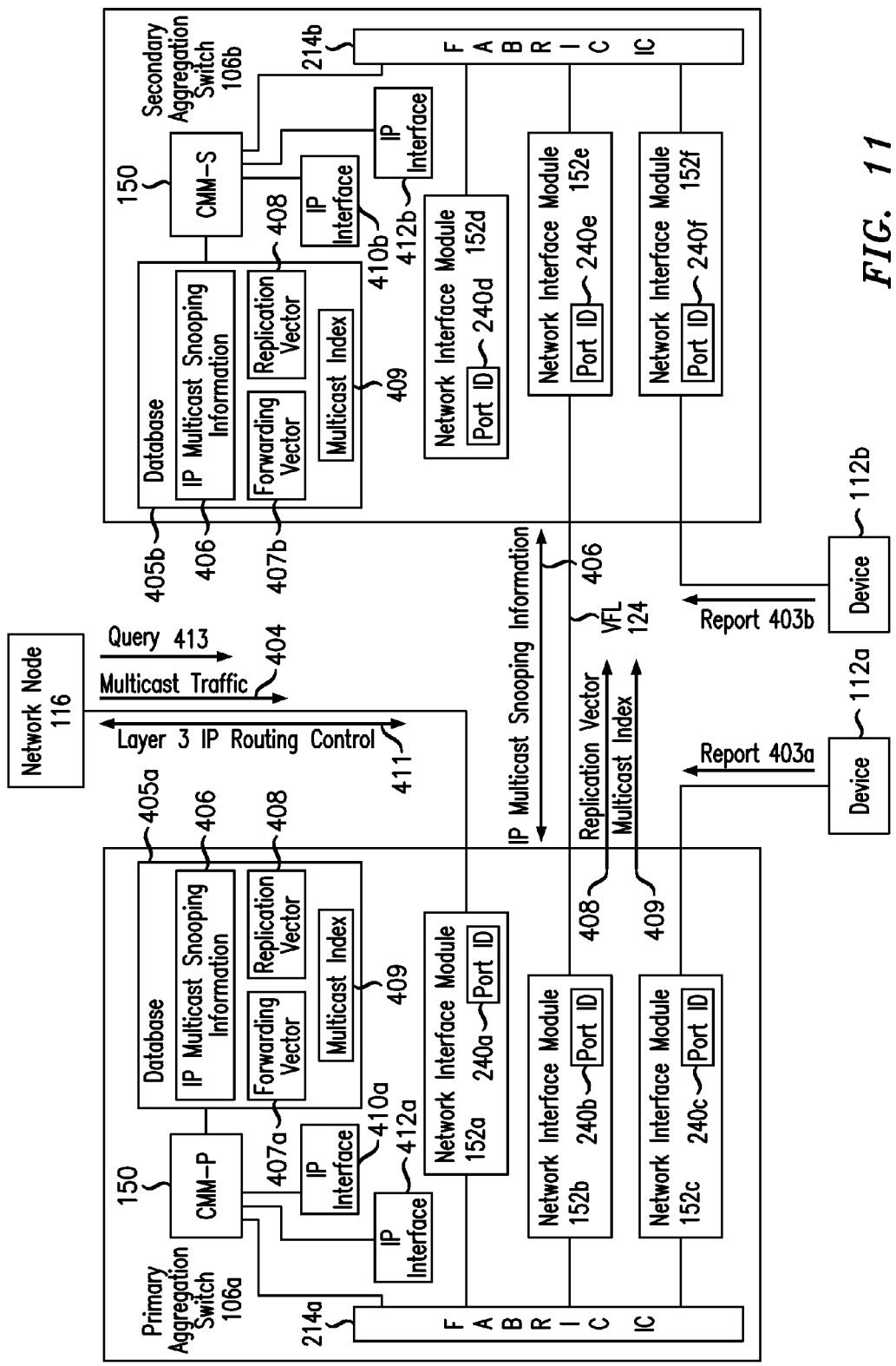
FIG. 11 illustrates a schematic block diagram of an embodiment of sharing IP multicast snooping information in accordance with the present invention.

FIG. 11 illustrates in more detail the sharing of IP multicast snooping information between the Aggregation Switches 106a and 106b. The Aggregation Switches 106a and 106b each include at least one respective CMM 150 (CMM-P and CMM-S) as well as a plurality of Network Interface modules (NIM) 152, such as line cards or port modules, which are all interconnected via a respective switching fabric IC 214. In the example shown in FIG. 11, Aggregation Switch 106a includes NIMs 152a, 152b and 152c, while Aggregation Switch 106b includes NIMs 152d, 152e and 152f. Each NIM 152a-f includes at least one physical port 240a-f, each assigned a respective port interface identifier (Port ID), e.g., device port values, such as gport and dport values. On Aggregation Switch 106a, port 240a is shown coupled to network node 116, port 240b is shown coupled to Aggregation Switch 106b via VFL 124 and port 240c is shown coupled to a home network device 112a (via an Edge Node, not shown). On Aggregation Switch 106b, port 240e is shown coupled to port 240b on Aggregation Switch 106a via VFL 125 and port 240f is shown coupled to another home network device 112b (via an Edge Node, not shown).

Each of the CMMs 150 (CMM-P and CMM-S) runs a respective IPMS (IP Multicast Snooping) process and stores respective IP multicast snooping information 406 within a respective database 405a and 405b. In an embodiment, the IPMS (IP Multicast Snooping) processes on the CMMs 150 of each Aggregation Switch 106a and 106b are synchronized via the VFL 124. For example, the IP multicast snooping information 406 can be transferred between the Aggregation Switches 106a and 106b using proprietary messages via the inter-chassis IPC (shown in FIG. 8). Thus, the IPMS process on each CMM 150 processes packets from either from the Virtual Fabric Link 124 or the external ports (e.g., ports 240a, 240c and 2400 as normal multicast packets and updates their respective tables accordingly. For example, the packets to be transferred to the peer chassis may include packets that traditionally are trapped to the CPU within the CMM 150 for IPMS to process (e.g. multicast membership reports, multicast queries, multicast sources, multicast flows and routing protocol hellos).

In an embodiment, the scope of the downstream IP multicast snooping information to be synchronized relates to all protocol state (IP multicast snooping information 406) constructed with data ingressing either Aggregation Switch 106a or 106b via an MCLAG aggregate port only. In this embodiment, synchronization of state derived from packets that entered the system via fixed ports or ordinary aggregate ports does not occur.

In another embodiment, all downstream IP multicast snooping information is synchronized regardless of the type of port on which the information ingressed. In this embodiment, synchronization of state derived from packets that entered the system via fixed ports, ordinary aggregate ports and MCLAG ports occurs.

For example, IP multicast traffic 404 received on port 240a from network node 116 is reported to CMM-P 150, which stores flow information derived from the IP multicast traffic 404 as IP multicast snooping information 406 within database 405a. As part of the IP multicast snooping information 406, the CMM-P may also create a flow record for the IP multicast traffic 404 and store the flow record, along with hardware device information for the IP multicast traffic 404 (e.g., the port ID of the external port 240a that received the IP multicast traffic 404 as the source port) in the database 405a. The CMM-P further uses the hardware device information to compute a forwarding vector 407a for the IP multicast traffic 404. The forwarding vector 407a represents the internal switching of the IP multicast traffic 404 from the source port (external port 240a) to one or more VLAN ports for forwarding of the IP multicast traffic 404 to the home network devices 112 that requested the IP multicast traffic.

In addition, CMM-P 150 also shares the derived IP multicast snooping information (i.e., the flow information) 406 with CMM-S on Aggregation Switch 106b via NIM 152b/port 240b, VFL 124 and NIM 152e/port 240e. CMM-S 150 also updates the IP multicast snooping information 406 stored in database 405b with the received flow information, creates a flow record for the flow information and stores the flow record and the port ID of the VFL (i.e., port 240e) as the source port for the flow information in the database 405b. As on Aggregation Switch 106a, CMM-S further uses the source port (port ID of VFL port 240e) for the IP multicast traffic to compute a respective forwarding vector 407b for the IP multicast traffic 404.

As another example, a query 413 received on port 240a from network node 116 is reported to CMM-P 150, which stores query information derived from the query 413 as IP multicast snooping information 406 within database 405a. As part of the IP multicast snooping information 406, the CMM-P may also create a query record for the query 413 and store the query record, along with hardware device information for the query 413 (e.g., the port ID of the external port 240a that received the query 413 as the source port) in the database 405a. The CMM-P further uses the hardware device information to compute a forwarding vector 407a for the query 413. The forwarding vector 407a represents the internal switching of the query 413 from the source port (external port 240a) to one or more VLAN ports for forwarding the query 413 to home network devices 112 that may desire multicast traffic.

In addition, CMM-P 150 also shares the derived IP multicast snooping information (i.e., the query information) 406 with CMM-S on Aggregation Switch 106b via NIM 152b/port 240b, VFL 124 and NIM 152e/port 240e. CMM-S 150 also updates the IP multicast snooping information 406 stored in database 405b with the received query information, creates a query record for the query information and stores the query record and the port ID of the VFL (i.e., port 240e) as the source port for the query information in the database 405b. As on Aggregation Switch 106a, CMM-S further uses the source port (port ID of VFL port 240e) for the query to compute a respective forwarding vector 407b for the query 413.

As yet another example, a multicast membership report 403a received from home network device 112a at port 240c is processed by CMM-P 150 to derive IP multicast snooping information 406 that is then stored in database 405a. As part of the IP multicast snooping information 406, the CMM-P may also create a membership record for the membership report 403a and store the membership record, along with hardware device information (e.g., the port ID of the external port 240c that received the report 403a) in the database 405a.

The CMM-P may further use the hardware device information to compute a forwarding vector 407a for the IP multicast data stream requested by the home network device 112a in the report 403a.

In an embodiment, if the report 403a was received over an MC-LAG aggregate port, CMM-P 150 shares the IP multicast snooping information 406 with CMM-S 150 on the remote Aggregate Switch 106b via VFL 124 and ports 240b and 240e. CMM-S will "learn" this information 406 as if it were received on a local MC-LAG port of Aggregate Switch 106b. For example, assuming device 112a is connected to Aggregate Switches 106a and 106b via an Edge Node (not shown) having an MCLAG connection to the Aggregate Switches 106a and 106b at ports 240c of Aggregate Switch 106a and port 240d of Aggregate Switch 106b, although the report 403a is sent over the link coupled to port 240c, CMM-S 150 will "learn" about the report 403a as if it were received on port 240d. To facilitate this learning, CMM-S will receive the port ID of the source port (e.g., port 240c) that received the report 403a with the IP multicast snooping information 406. CMM-S will then determine whether the source port (port 240c) is an MCLAG port. If so, CMM-S will determine the local port (e.g., port 240d) of the MCLAG on Aggregate Switch 106b and store the port ID of the local port (port 240d) as the source port for the IP multicast snooping information 406.

Thus, CMM-S 150 will store the membership record, along with the port ID of the port 240d for the report 403a in the database 405a. CMM-S may further use the port ID of port 240d to compute a forwarding vector 407b for the IP multicast data stream requested by the home network device 112a in the report 403a. Therefore, multicast traffic ingressing at Aggregation Switch 106b and destined for device 112a can be forwarded on the local MCLAG port (e.g., port 240d), instead of forwarded over to the VFL 124 to Aggregate Switch 106a to be sent out port 240c, which reduces the amount of traffic on the VFL 124.

In another embodiment, if the report 403a was received over a fixed or ordinary aggregate port, CMM-P 150 may share the IP multicast snooping information 406 with CMM-S 150 on the remote Aggregate Switch 106b. If the information is shared, CMM-S will "learn" this information 406 as if it were received on a VFL port (e.g., port 240e) of Aggregate Switch 106b. Therefore, multicast traffic ingressing at Aggregation Switch 106b and destined for device 112a can be forwarded over to the VFL 124 to Aggregate Switch 106a to be sent out the fixed or ordinary aggregate port 240c.

Likewise, a multicast report 403b received from home network device 112b at port 240f of Aggregation Switch 106b is processed by CMM-S 150 to derive IP multicast snooping information 406 that is then stored in database 405b. As part of the IP multicast snooping information 406, the CMM-S may also create a membership record for the report 403b and store the membership record, along with hardware device information (e.g., the port ID of the external port 240f that received the report 403b) in the database 405b. The CMM-S may further use the hardware device information to compute a forwarding vector 407b for the IP multicast data stream requested by the home network device 112b in the report 403b.

In an embodiment, if the report 403b was received over an MC-LAG aggregate port, CMM-S 150 shares the IP multicast snooping information 406 with CMM-P 150 on the remote Aggregate Switch 106b. CMM-P will "learn" this information 406 as if it were received on a local MC-LAG port of Aggregate Switch 106a and store the port ID of the local port as the source port for the IP multicast snooping information 406. In another embodiment, if the report 403b was received over a fixed or ordinary aggregate port, CMM-S 150 may share the IP multicast snooping information 406 with CMM-P 150 on Aggregate Switch 106a. If the information is shared, CMM-P will "learn" this information 406 as if it were received on a VFL port (e.g., port 240b) of Aggregate Switch 106a.

In addition to the Layer 2 switching of IP multicast traffic, the multi-chassis system must also support Layer 3 IP interfaces 410a and 410b on VLAN's attached to the MCLAG aggregate ports to enable Protocol Independent Multicast (PIM) processes running on the CMMs 150 to provide multicast routing services via the MCLAG aggregates. As shown in FIG. 11, both multi-chassis Aggregate Switches 106a and 106b have separate IP interfaces 410a and 410b, each for separately connecting to the upstream routers. Although only one IP interface 410a and 410b is shown per switch 106a and 106b, it should be understood that multiple IP interfaces for each switch can be configured for each VLAN (corresponding to a distinct subnet) of the switch 106a/106b. For example, each NIM 152a-f can include a separate IP interface for managing the VLAN associated with that NIM 152a-f. As an example, IP Interfaces 412a and 412b can each be attached to the VLAN coupling the Aggregate Switches to Network Node 116 and can each run PIM independently.

However, a basic routing principle states that IP addresses must be unique throughout the network. Therefore, in order to support the IP interfaces 410a and 410b on VLAN's attached to MCLAG aggregates, the IP subnet running on a MCLAG VLAN can only be singly-attached to any outside Layer 3 routing infrastructure. In other words, there is a single Layer 3 exit point from the MCLAG's IP subnet, and that Layer 3 exit point is formed of a virtual router which runs across the pair of MCLAG Aggregation Switches 106a and 106b.

In an embodiment, the virtual router includes respective IP interfaces 410a and 410b running on each of the Aggregation Switches 106a and 106b that are configured as a virtual IP VLAN (VIP-VLAN). When PIM detects that it is running on a VIP-VLAN, PIM auto-configures the IP interfaces 410a and 410b as stub networks to prevent the PIM process on the IP interfaces 410a and 410b from sending or processing received Layer 3 multicast routing control packets on the MCLAG. However, the PIM routing functionality is enabled on IP interfaces 410a and 410b. In addition, membership reports, multicast data sources and other Layer 2 IP multicast snooping information are still learned and processed accordingly, as described above.

In addition, one of the Aggregation Switches (e.g., Aggregation Switch 106a) is designated as a "primary" Aggregation Switch and the other Aggregation Switch (e.g., Aggregation Switch 106b) is designated as a "secondary" Aggregation Switch. The Primary Aggregation Switch 106a is responsible for advertising and requesting streams from the upstream routers (e.g., Network Node 116) for the MCLAG on an IP interface (e.g., IP Interface 412a) that is running PIM as a regular network. Since Layer 3 routing processes are only running on the Primary Aggregation Switch 106a for the MCLAG VLANs via IP Interface 412a, the CMM (CMM-P) 150 on the Primary Aggregation Switch 106a is responsible for providing the IP multicast snooping information 406 to the IP interface 412a to enable the IP interface 410a to send/receive the IP routing control packets 411.

Moreover, for PIM routing, the IPMS process will only notify the PIM router (e.g., IP Interface 410a) for the MCLAG VLAN on the Primary Aggregation Switch 106a about incoming flows and groups. As such, only the Primary Aggregation Switch 106a is responsible for forwarding the multicast traffic on MCLAG VLANs, since only the Primary Aggregation Switch will be notified about the flows and groups.

In addition, the CMM-P 150 on the Primary Aggregation Switch 106*a* is also responsible for computing the replication vector 408 for a multicast stream and storing the replication vector 408 in the database 405*a*. The replication vector 408 provides a list of VLAN ID's for which a packet needs to be replicated at a single port (this applies to a scenario where multiple VLAN's are aggregated on a single port). The replication vector 408 is also shared with the Secondary Aggregation Switch 106*b* via the VFL 124 and maintained within the secondary database 405*b* by CMM-S 150. Moreover, the CMM-P is further responsible for creating the multicast index 409 for a particular received multicast stream (e.g., multicast traffic 404) and for sharing the multicast index 409 with the CMM-S 150 on the Secondary Aggregation Switch 106*b* via the VFL 124. The multicast index 409 is a unique identifier assigned to an ingressing multicast flow based on the IP source, the destination addresses and ingress VLAN that enables each port to determine whether or not to forward the multicast flow. Since multicast flows may be passed over the VFL 125, the multicast indices are a globally shared resource between switches 106*a* and 106*b*.

The network interface modules 152 and chassis management modules 150 each include one or more processing devices, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The NIMs 152 and CMMs 150 also include a memory that is an internal memory or an external memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. In addition, the NIMs 152 and CMMs 150 may implement one or more of their functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Furthermore, the NIMs 152 and CMMs 150 may execute hard-coded and/or software and/or operational instructions stored by the internal memory and/or external memory to perform the steps and/or functions described herein and may be implemented in a single or in one or more integrated circuits.

Figure 12:
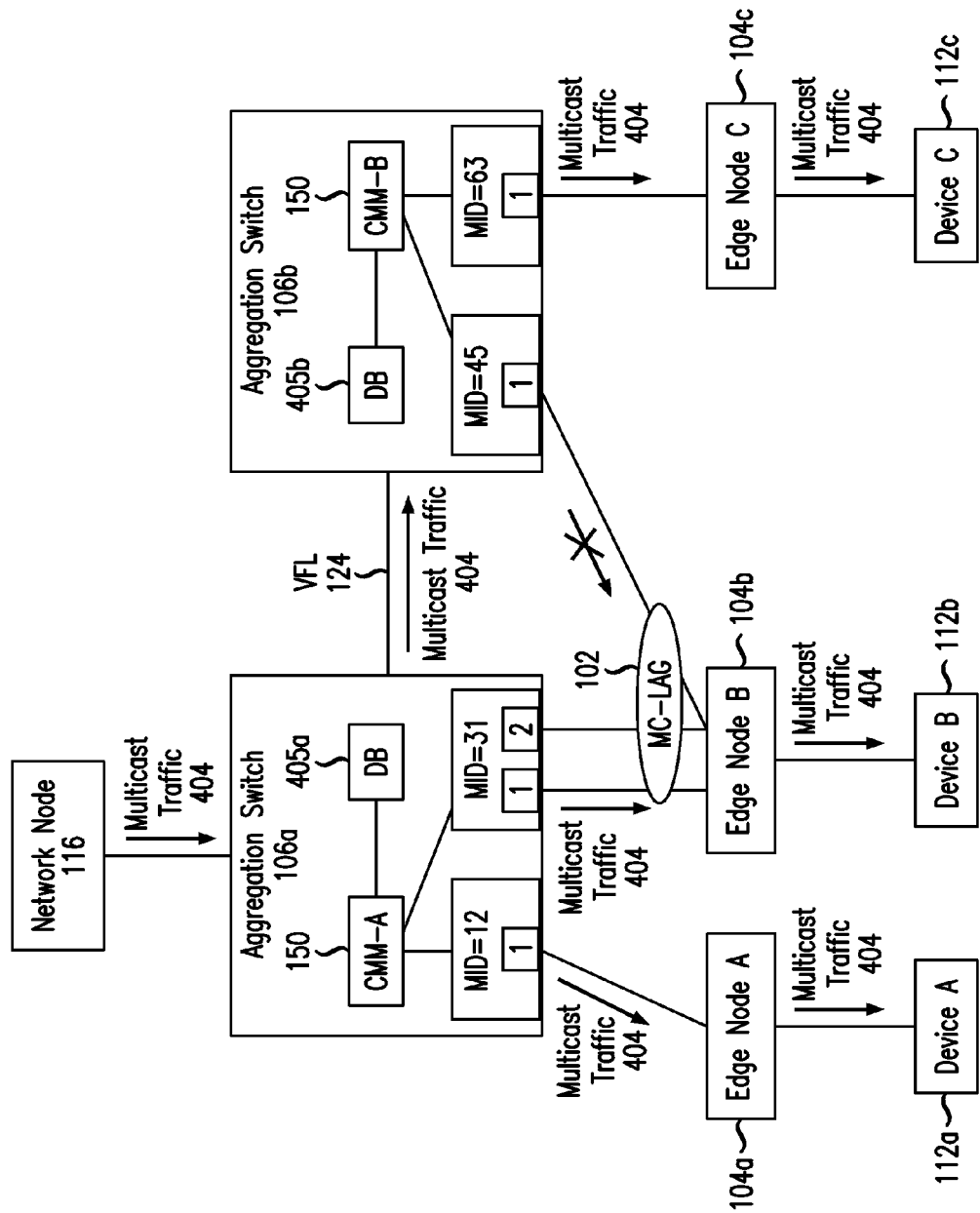
FIG. 12 illustrates a schematic block diagram of an embodiment of IP multicast switching in accordance with the present invention.

FIG. 12 illustrates a schematic block diagram of an embodiment of IP multicast switching in accordance with the present invention. In this example, a network node 116 routes a multicast data stream (multicast traffic) 404 towards Aggregation Switch 106*a*. Upon receipt of the multicast traffic 404, CMM-P 150 on Aggregation Switch 106*a* accesses the database 405*a* to store/retrieve IP multicast snooping information and to compute the replication vector, forwarding vector and multicast index for the multicast traffic 404 to switch the multicast traffic 404 to the appropriate external ports for forwarding to the VLANs containing home network devices that requested the multicast traffic 404.

For example, in FIG. 12, home network device 112*a* connected to Edge Node A 104*a*, home network device 112*b* connected to Edge Node B 104*b* and home network device 112*c* connected to Edge Node C 104*c* have each requested to receive the multicast traffic 404. Since Edge Node A 104*a* is connected to Aggregation Switch 106*a* via a fixed port (e.g., port 1 of Switching ASIC MID=12), the forwarding vector in Aggregation Switch 106*a* would indicate that the multicast traffic 404 should be forwarded over port 1 of Switching ASIC MID=12. However, Edge Node B 104*b* is connected to both Aggregation Switches 106*a* and 106*b* via MCLAG 102. Since Aggregation Switch 106*a* received the multicast traffic 404 from Network Node 116, the forwarding vector in Aggregation Switch 106*a* would indicate that the multicast traffic 404 should be forwarded over one of the local ports of Aggregation Switch 106*a* (e.g., port 1 of Switching ASIC MID=31) connected to the MCLAG 102.

In addition, since Edge Node C 104*c* is only connected to Aggregation Switch 106*b* via a fixed port (e.g., port 1 of MID=63), the forwarding vector in Aggregation Switch 106*a* would indicate that the multicast traffic 404 should be forwarded on the VFL 124 to Aggregation Switch 106*b*. Upon receiving the multicast traffic via the VFL 124, the CMM (CMM-S) 150 in Aggregation Switch 106*b* accesses the database 405*b* to store/retrieve IP multicast snooping information associated with the multicast traffic 404 and to compute the forwarding vector for the multicast traffic 404. The forwarding vector in Aggregation Switch 106*b* would indicate that the multicast traffic 404 should be forwarded over port 1 of Switching ASIC MID=63 to Edge Node C 104*c*. However, since Aggregation Switch 106*b* received the multicast traffic 404 via the VFL 124 (and not directly from the Network Node), the forwarding vector would not indicate to forward the multicast traffic over the local port of the MCLAG connected to Edge Node B 104*b* (e.g., port 1 of MID=45). The loop prevention mechanism in the Aggregate Switches 106*a* and 106*b* (as described above) prevents forwarding of packets received by an Aggregation Switch 106 over the Virtual Fabric Link 124 over local MC-LAG member ports.

Figure 13:
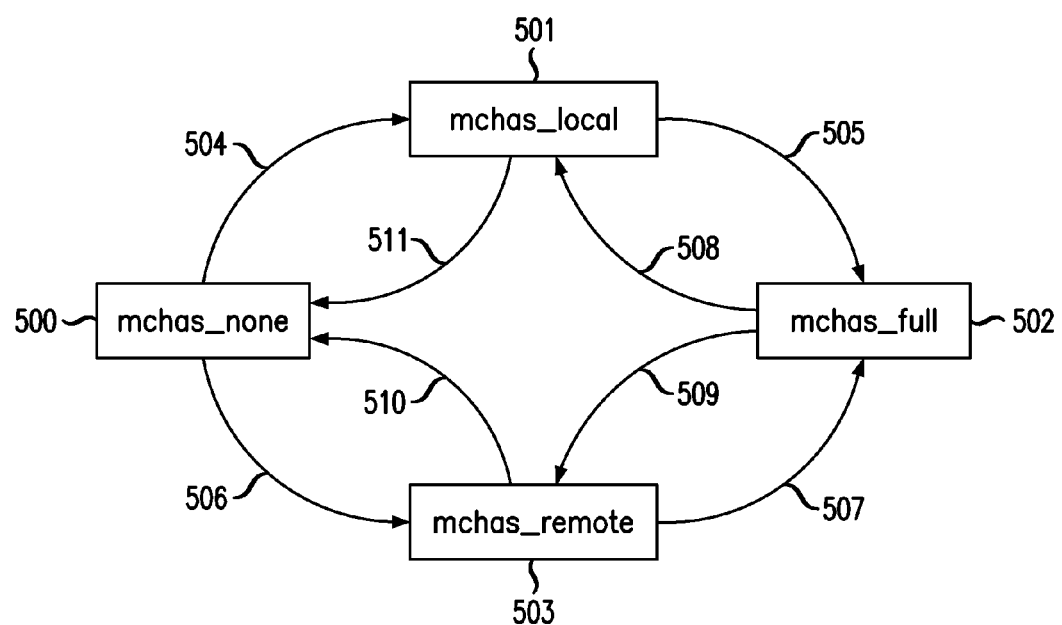
FIG. 13 illustrates an exemplary state diagram of the Aggregation Switches for multicast traffic in accordance with the present invention.

FIG. 13 illustrates an exemplary state diagram of the Aggregation Switches for multicast traffic in accordance with the present invention. There are four states shown in FIG. 13, mchas_none 500, mchas_local 501, mchas_full 502 and mchas_remote 503. The initiate state is mchas_none 500, which corresponds to a state where IP multicast snooping or routing is not enabled on either of the Aggregation Switches of the multi-chassis system. At transition 504, the state changes to mchas_local, which corresponds to a state where IP multicast snooping or routing is enabled for the first time on the local Aggregation Switch. Upon completion of the transition 504 to mchas_local, the local Aggregation Switch can send an MCHAS_UP message to the remote Aggregation Switch and configure all ports on the VFL link to accept multicast traffic. At transition 505, the state changes to mchas_full 502, in which both the local and remote Aggregation Switches are on-line and have multicast snooping enabled. At transition 505, the local Aggregation Switch receives an MCHAS_UP message from the remote Aggregation Switch and the local Aggregation Switch sends any previously learned IP multicast snooping information (e.g., memberships, neighbors, queries and flows) to the remote Aggregation Switch. The local and remote Aggregation Switches then continue to share any newly discovered IP multicast snooping information therebetween.

If IP multicast snooping is enabled in the remote Aggregation Switch first, the transition follows path 506 towards state mchas_remote 503. This transition to mchas_remote occurs when the local Aggregation Switch receives an MCHAS_UP message from the remote Aggregation Switch. Upon transitioning, the local Aggregation Switch configures the VFL link ports to accept multicast traffic. Then, at transition 507, when the local Aggregation Switch is enabled, the state changes to mchas_full 502, the MCHAS_UP message is sent to the remote Aggregation Switch and the IP multicast snooping information is shared between the local and remote Aggregation Switches (previously learned and newly discovered).

At transition 508, an MCHAS_DOWN message is received from the remote Aggregation Switch at the local Aggregation Switch and the state changes back to mchas_local 501. After the transition back to mchas_local, the local Aggregation Switch discontinues sending updated IP multicast snooping information to the remote Aggregation Switch. At transition 511, IP multicast snooping or routing is disabled for all VLANs on the local Aggregation Switch, and therefore, the state changes back to mchas_none 500. After transitioning to mchas_none 500, an MCHAS_DOWN message is sent to the remote Aggregation Switch and the multicast configuration is removed from the VFL ports.

If the local Aggregation Switch goes down first, at transition 509, the state changes to mchas_remote 503, the MCHAS_DOWN message is sent from the local Aggregation Switch to the remote Aggregation Switch and the local and remote Aggregation Switches discontinue sharing snooping information. At transition 510, an MCHAS_DOWN message is received from the remote Aggregation Switch, which causes the state to change to mchas_none 500 and the multicast configuration to be removed from all VFL link ports.

Figure 14:
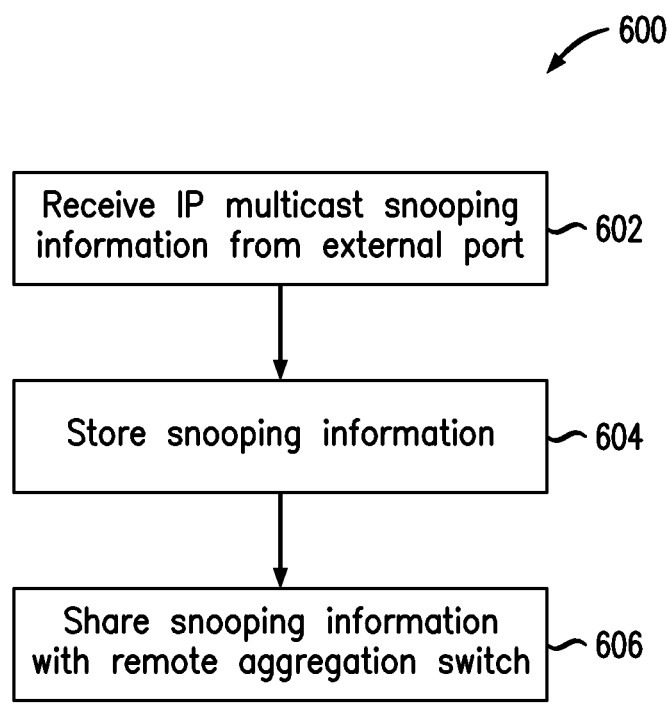
FIG. 14 illustrates an exemplary flow diagram of a method for performing IP multicast snooping in accordance with the present invention.

FIG. 14 illustrates an exemplary flow diagram of a method 600 for performing IP multicast snooping in accordance with the present invention. The method begins at 602, where IP multicast snooping information is received at a local one of the Aggregation Switches via an external port. At 604, the local Aggregation Switch stores the IP multicast snooping information, and at 606, shares the IP multicast snooping information with the remote Aggregation Switch.

Figure 15:
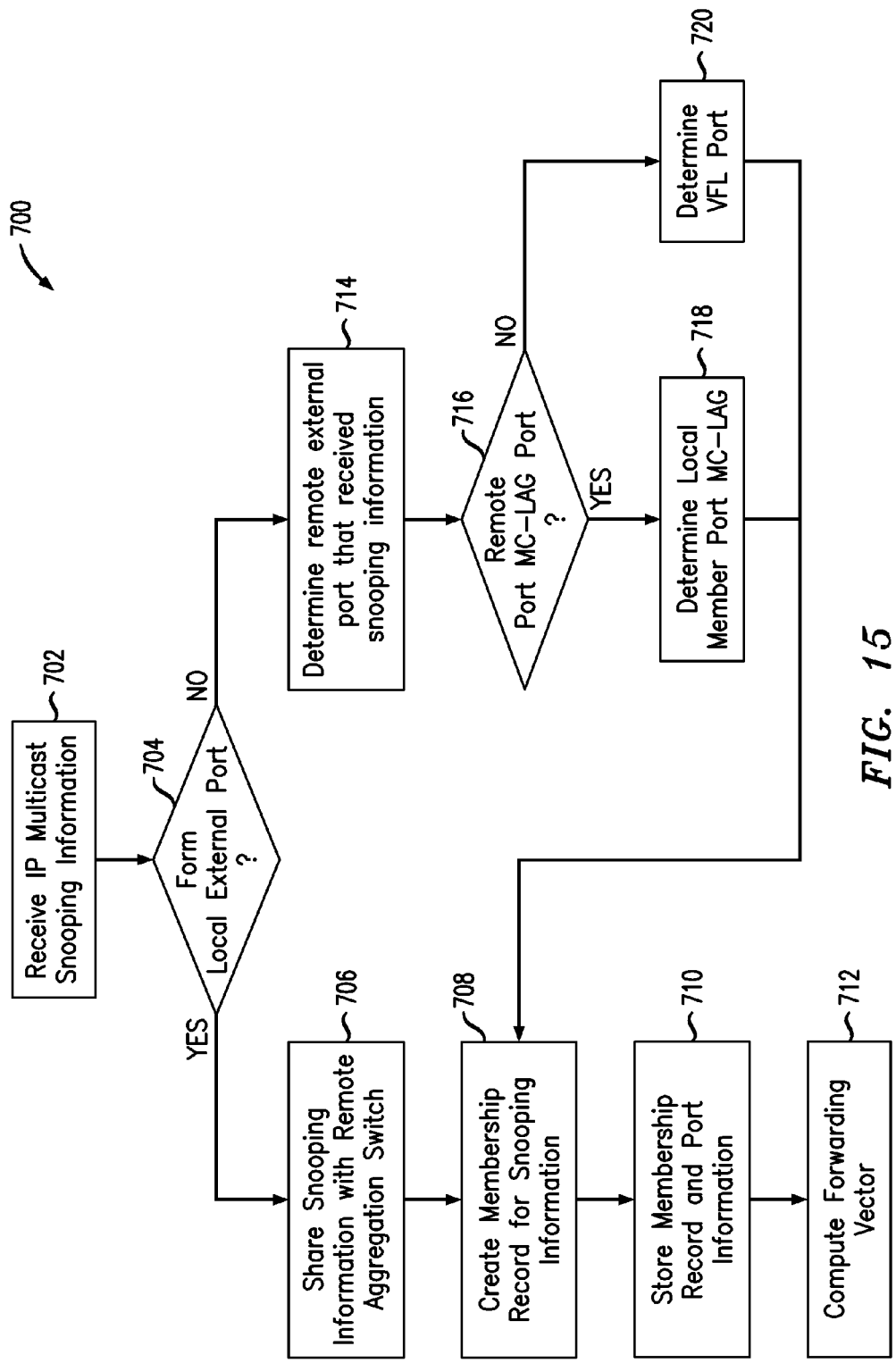
FIG. 15 illustrates another exemplary flow diagram of a method for performing IP multicast snooping in accordance with the present invention.

FIG. 15 illustrates another exemplary flow diagram of a method 700 for performing IP multicast snooping in accordance with the present invention. The method begins at 702, where IP multicast snooping information is received at a local Aggregation Switch. At 704, the local Aggregation Switch determines whether the IP multicast snooping information was received from a local external port of the local Aggregation Switch. If so, at 706, the local Aggregation Switch shares the IP multicast snooping information with the remote Aggregation Switch. Then, at 708-712, the local Aggregation Switch creates a membership record for the IP multicast snooping information, stores the membership record and port information for the local external port that received the IP multicast snooping information and computes a forwarding vector for the IP multicast snooping information using the port information.

If, at 704, the local Aggregation Switch determines that the IP multicast snooping information was not received from a local external port of the local Aggregation Switch, at 714, the local Aggregation Switch determines the port ID of the remote external port on the remote Aggregation Switch at which the IP multicast snooping information was received. If, at 716, the remote port is an MCLAG port, at 718, the local Aggregation Switch determines the port ID of a local port of the MCLAG. Then, at 708-712, the local Aggregation Switch creates a membership record for the IP multicast snooping information, stores the membership record and port information for the local MCLAG port and computes a forwarding vector for the IP multicast snooping information using the port information.

However, if at 716, the local Aggregation Switch determines that the remote external port is not an MCLAG port, at 720, the local Aggregation Switch determines the port ID of a VFL port. Then, at 708-712, the local Aggregation Switch creates a membership record for the IP multicast snooping information, stores the membership record and port information for the VFL port and computes a forwarding vector for the IP multicast snooping information using the port information.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. An aggregation switch in a multi-chassis system for performing Internet Protocol (IP) multicast snooping, comprising:
   a plurality of virtual fabric link (VFL) ports coupled to a VFL, wherein the VFL is connected to a remote aggregation switch, wherein the remote aggregation switch is active and in a separate physical chassis;
   a plurality of external ports coupled to at least one edge node and at least one network node;
   a database maintaining IP multicast snooping information; and
   a chassis management module for receiving the snooping information via at least the external ports, storing the snooping information within the database and sharing the snooping information substantially in real-time with the remote aggregation switch via the VFL;
   wherein the chassis management module further builds respective forwarding vectors for multicast traffic flows received from the at least one network node via the external ports or the VLF ports based on the snooping information;
   wherein the chassis management module further determines a multicast index for a received multicast traffic flow to set-up hardware paths for forwarding the received multicast traffic flow to the external ports in a virtual local area network (VLAN) that requested the received multicast traffic flow via the at least one edge node, the multicast index being used globally between the aggregation switch and the remote aggregation switch.

2. The aggregation switch of claim 1, wherein the chassis management module shares the snooping information with an additional chassis management module on the remote aggregation switch via a logical inter-process communication (IPC) channel over the VFL.

3. The aggregation switch of claim 1, wherein the snooping information includes at least one of group membership information identifying groups for receiving multicast traffic flows, queries for multicast traffic flows, identifiers of multicast traffic flows and identifiers of neighboring multicast routers.

4. The aggregation switch of claim 1, wherein:
   one or more of the external ports are member ports of a multi-chassis link aggregation group (MC-LAG) connected to an edge node; and
   the remote aggregation switch includes one or more of the member ports of the MC-LAG.

5. The aggregation switch of claim 4, wherein the chassis management module further receives a portion of the snooping information from the remote aggregation switch via the VFL, the portion of the snooping information having remote hardware device information associated therewith, the remote hardware device information including a remote external port identifier of a remote external port that received the snooping information on the remote aggregation switch.

6. The aggregation switch of claim 5, wherein the chassis management module further:
   determines whether the remote hardware device information identifies one of the member ports of the MC-LAG on the remote aggregation switch;
   when the remote hardware device information identifies one of the member ports of the MC-LAG on the remote aggregation switch:
       determines a local member port of the MC-LAG on the aggregation switch,
       creates a membership record for the portion of the snooping information,
       stores the membership record and local hardware device information of the local member port of the MC-LAG in the database for the portion of the snooping information, and
       uses the local hardware device information to compute a forwarding vector for the portion of the snooping information.

7. The aggregation switch of claim 6, wherein, when the remote hardware device information does not identify one of the member ports of the MC-LAG on the remote aggregation switch, the chassis management module further:
   stores the membership record and VFL hardware device information of the VFL in the database for the portion of the snooping information; and
   uses the VFL hardware device information to compute a forwarding vector for the portion of the snooping information.

8. The aggregation switch of claim 1, wherein the chassis management module further:
   receives a portion of the snooping information from the remote aggregation switch via the VFL, the portion of the snooping information including a source address, group address and flow characteristics of a multicast data source and further including remote hardware device information associated therewith, the remote hardware device information including a remote external port identifier of a remote external port that received the snooping information on the remote aggregation switch;
   creates a flow record for the portion of the snooping information;
   stores the flow record and VFL hardware device information of the VFL in the database for the portion of the snooping information; and
   uses the VFL hardware device information to compute a forwarding vector for the portion of the snooping information.

9. The aggregation switch of claim 1, wherein the aggregation switch is a primary switch and the remote aggregation switch is a secondary switch, and wherein the chassis management module further configures:
   a virtual IP interface associated with a virtual IP virtual local area network (VIP VLAN) coupling the primary switch and the secondary switch to a MC-LAG as a stub network to prevent the virtual IP interface from sending and processing received Layer 3 routing control packets on the external ports, the virtual IP interface being further configured as a designated Protocol Independent Multicast (PIM) router for the VIP VLAN; and
   a network IP interface associated with a VLAN coupling the primary switch to a network node as a normal IP interface to enable the network interface to send and receive Layer 3 routing control packets for the VIP VLAN on the external ports;
   wherein the chassis management module and provides the snooping information to the network IP interface to enable the network IP interface to send and receive the Layer 3 routing control packets on the external ports.

10. The aggregation switch of claim 9, wherein the chassis management module further builds replication vectors for multicast traffic flows based on the Layer 3 routing control packets and provides the replication vectors to the remote aggregation switch.

11. The aggregation switch of claim 1, wherein the aggregation switch is a secondary switch and the remote aggregation switch is a primary switch, and wherein the chassis management module further configures a virtual IP interface associated with a virtual IP virtual local area network (VIP VLAN) coupling the primary switch and the secondary switch to a MC-LAG as a stub network to prevent the virtual IP interface from sending and processing received Layer 3 routing control packets on the external ports.

12. The aggregation switch of claim 1, wherein the chassis management module further builds the forwarding vector for the received multicast traffic flow based on the multicast index.

13. The aggregation switch of claim 1, wherein the aggregation switch is a primary switch and the remote aggregation switch is a secondary switch, and wherein the chassis management module on the primary switch allocates the multicast index for the received multicast traffic flow and shares the multicast index with the secondary switch.

14. The aggregation switch of claim 1, wherein the aggregation switch is a secondary switch and the remote aggregation switch is a primary switch, and wherein the chassis management module on the secondary switch is prevented from allocating the multicast index for the received multicast traffic flow and receives the multicast index from the primary switch.

15. A method for performing Internet Protocol (IP) multicast snooping on an aggregation switch in a multi-chassis system, comprising:
receiving snooping information via at least external ports coupled to at least one edge node and at least one network node;
storing the snooping information within a database;
sharing the snooping information substantially in real-time with a remote aggregation switch via a virtual fabric link (VFL) therebetween, wherein the remote aggregation switch is active and in a separate physical chassis
building respective forwarding vectors for multicast traffic flows received from the at least one network node based on the snooping information; and
determining a multicast index for a received multicast traffic flow to set-up hardware paths for forwarding the received multicast traffic flow to the external ports in a virtual local area network (VLAN) that requested the received multicast traffic flow via the at least one edge node, the multicast index being used globally between the aggregation switch and the remote aggregation switch.

16. The method of claim 15, wherein one or more of the external ports are member ports of a multi-chassis link aggregation group (MC-LAG) connected to an edge node and the remote aggregation switch includes one or more of the member ports of the MC-LAG connected to the edge node and wherein the receiving the snooping information further includes:
receiving a portion of the snooping information from the remote aggregation switch via the VFL, the portion of the snooping information having remote hardware device information associated therewith, the remote hardware device information including a remote external port identifier of a remote external port that received the snooping information on the remote aggregation switch.

17. The method of claim 16, further comprising:
determining whether the remote hardware device information identifies one of the member ports of the MC-LAG on the remote aggregation switch;
when the remote hardware device information identifies one of the member ports of the MC-LAG on the remote aggregation switch, determining a local member port of the MC-LAG on the aggregation switch and storing a membership record and local hardware device information of the local member port of the MC-LAG in the database for the portion of the snooping information; and
when the source hardware device information does not identify one of the member ports of the MC-LAG on the remote aggregation switch, storing the membership record and VFL hardware device information of the VFL in the database for the portion of the snooping information.

18. The method of claim 15, wherein the aggregation switch is a primary switch and the remote aggregation switch is a secondary switch, and further comprising:
configuring a virtual IP interface associated with a virtual IP virtual local area network (VIP VLAN) coupling the primary switch and the secondary switch to a MC-LAG as a stub network to prevent the virtual IP interface from sending and processing received Layer 3 routing control packets on the external ports, the virtual IP interface being further configured as a designated Protocol Independent Multicast (PIM) router for the VIP VLAN;
configuring a network IP interface associated with a VLAN coupling the primary switch to a network node as a normal IP interface to enable the network interface to send and receive Layer 3 routing control packets for the VIP VLAN on the external ports; and
providing the snooping information to the network IP interface to enable the network IP interface to send and receive the Layer 3 routing control packets on the external ports.

19. The method of claim 15, wherein the aggregation switch is a secondary switch and the remote aggregation switch is a primary switch, and further comprising:
configuring a virtual IP interface associated with a virtual IP virtual local area network (VIP VLAN) coupling the primary switch and the secondary switch to a MC-LAG as a stub network to prevent the virtual IP interface from sending and processing received Layer 3 routing control packets on the external ports.

* * * * *